(12) United States Patent
Shen et al.

(10) Patent No.: US 11,412,494 B2
(45) Date of Patent: Aug. 9, 2022

(54) METHOD FOR TRANSMITTING DOWNLINK CONTROL INFORMATION, TERMINAL, AND NETWORK SIDE DEVICE

(71) Applicant: VIVO MOBILE COMMUNICATION CO., LTD., Chang'an Dongguan (CN)

(72) Inventors: Xiaodong Shen, Chang'an Dongguan (CN); Zichao Ji, Chang'an Dongguan (CN); Yu Ding, Chang'an Dongguan (CN); Zhi Lu, Chang'an Dongguan (CN)

(73) Assignee: VIVO MOBILE COMMUNICATION CO, , LTD., Guangdong (CN)

( * ) Notice: Subject to any disclaimer, the term of this patent is extended or adjusted under 35 U.S.C. 154(b) by 117 days.

(21) Appl. No.: 16/611,113

(22) PCT Filed: Apr. 27, 2018

(86) PCT No.: PCT/CN2018/084828
§ 371 (c)(1),
(2) Date: Nov. 5, 2019

(87) PCT Pub. No.: WO2018/201987
PCT Pub. Date: Nov. 8, 2018

(65) Prior Publication Data
US 2020/0059912 A1 Feb. 20, 2020

(30) Foreign Application Priority Data
May 5, 2017 (CN) .......................... 201710314145.2

(51) Int. Cl.
*H04W 72/04* (2009.01)
*H04L 1/00* (2006.01)

(52) U.S. Cl.
CPC ......... *H04W 72/042* (2013.01); *H04L 1/0038* (2013.01); *H04W 72/044* (2013.01)

(58) Field of Classification Search
CPC .......................... H04W 72/042; H04W 72/044
See application file for complete search history.

(56) References Cited

U.S. PATENT DOCUMENTS 9,173,212 B2 * 10/2015 Baker ................. H04W 72/042
9,407,412 B2 * 8/2016 Guan ...................... H04L 5/001
(Continued)

FOREIGN PATENT DOCUMENTS

| CN | 101808408 A | 8/2010 |
|----|-------------|--------|
| CN | 101998429 A | 3/2011 |

(Continued)

OTHER PUBLICATIONS

Extended European Search Report related to Application No. 18794805.4 dated Mar. 31, 2020.
(Continued)

*Primary Examiner* — Parth Patel
(74) *Attorney, Agent, or Firm* — von Briesen & Roper, s.c.

(57) ABSTRACT

A method of transmitting downlink control information, a terminal, and a network side device are provided. The method comprises: determining, by a terminal, resource configuration information corresponding to a control resource set; acquiring, by the terminal, blind detection information based on a first correspondence relation between the resource configuration information and the blind detection information, wherein the blind detection information includes at least one of: a length of the downlink control information DCI, an aggregation level of candidate control channels, and a length of a resource allocation RA field in the DCI; and receiving, by the terminal based on the blind detection information, DCI transmitted by the network side device on the control resource set.

17 Claims, 10 Drawing Sheets

(56) References Cited

U.S. PATENT DOCUMENTS

| | | | |
|---|---|---|---|
| 9,408,158 B2 | 8/2016 | Yin et al. | |
| 10,536,960 B2* | 1/2020 | Park | H04L 5/00 |
| 2012/0307759 A1* | 12/2012 | Miki | H04W 72/042 |
| | | | 370/329 |
| 2013/0114521 A1 | 5/2013 | Frenne et al. | |
| 2013/0114563 A1* | 5/2013 | Oizumi | H04L 5/001 |
| | | | 370/329 |
| 2013/0235812 A1* | 9/2013 | Heo | H04L 5/0023 |
| | | | 370/329 |
| 2014/0119335 A1* | 5/2014 | Wang | H04W 72/042 |
| | | | 370/330 |
| 2014/0146775 A1* | 5/2014 | Guan | H04L 5/0053 |
| | | | 370/329 |
| 2014/0211712 A1 | 7/2014 | Wang et al. | |
| 2014/0286297 A1 | 9/2014 | Zhao et al. | |
| 2015/0029984 A1* | 1/2015 | Wang | H04W 72/0446 |
| | | | 370/329 |
| 2015/0103715 A1 | 4/2015 | Chen et al. | |
| 2015/0131591 A1* | 5/2015 | Liu | H04L 5/00 |
| | | | 370/329 |
| 2015/0264678 A1 | 9/2015 | Yin et al. | |
| 2016/0143007 A1 | 5/2016 | Xu et al. | |
| 2016/0242153 A1* | 8/2016 | Chen | H04W 72/1263 |
| 2016/0249337 A1* | 8/2016 | Liang | H04W 72/042 |
| 2016/0323858 A1* | 11/2016 | Seo | H04W 48/12 |
| 2017/0099674 A1* | 4/2017 | Han | H04W 72/0406 |
| 2017/0156134 A1 | 6/2017 | Zhao et al. | |
| 2017/0223687 A1* | 8/2017 | Kuchibhotla | H04L 5/0094 |
| 2017/0265174 A1* | 9/2017 | Wang | H04W 72/042 |
| 2017/0374569 A1* | 12/2017 | Lee | H04L 1/0046 |
| 2018/0115394 A1* | 4/2018 | Harada | H04L 1/1861 |
| 2018/0132243 A1* | 5/2018 | Yang | H04W 72/0453 |
| 2018/0159643 A1* | 6/2018 | Huang | H04W 52/346 |
| 2018/0160402 A1* | 6/2018 | Huang | H04L 5/0053 |
| 2018/0167959 A1* | 6/2018 | Liao | H04W 72/1273 |
| 2018/0212800 A1 | 7/2018 | Park et al. | |
| 2018/0279273 A1* | 9/2018 | Yang | H04W 72/042 |
| 2018/0288715 A1* | 10/2018 | Ye | H04L 5/005 |
| 2019/0069276 A1* | 2/2019 | Kwak | H04L 1/00 |
| 2019/0103941 A1* | 4/2019 | Seo | H04L 5/00 |
| 2019/0334687 A1* | 10/2019 | Su | H04L 5/0035 |
| 2019/0349907 A1* | 11/2019 | Seo | H04L 5/0007 |
| 2019/0350049 A1* | 11/2019 | Miao | H04W 80/08 |
| 2019/0380125 A1* | 12/2019 | Yamamoto | H04L 5/0055 |
| 2020/0008216 A1* | 1/2020 | Iyer | H04W 72/1242 |
| 2020/0008231 A1* | 1/2020 | Vilaipornsawai | H04W 72/1273 |
| 2020/0015176 A1* | 1/2020 | Li | H04L 5/0082 |
| 2020/0022119 A1* | 1/2020 | Wang | H04W 72/1205 |
| 2020/0022121 A1* | 1/2020 | Li | H04W 72/042 |
| 2020/0036489 A1* | 1/2020 | Wang | H04L 1/16 |
| 2020/0036558 A1* | 1/2020 | Shen | H04L 5/0007 |
| 2020/0059912 A1* | 2/2020 | Shen | H04W 72/044 |
| 2020/0068591 A1* | 2/2020 | Xu | H04L 5/0048 |
| 2020/0092946 A1* | 3/2020 | Xiong | H04L 1/0071 |
| 2020/0119869 A1* | 4/2020 | Taherzadeh Boroujeni | H04L 5/0094 |
| 2020/0145130 A1* | 5/2020 | Shen | H04L 1/00 |
| 2020/0187236 A1* | 6/2020 | Moon | H04L 5/0044 |
| 2020/0213036 A1* | 7/2020 | Shen | H04L 5/0053 |
| 2020/0213837 A1* | 7/2020 | Pan | H04W 72/0446 |
| 2020/0275514 A1* | 8/2020 | Takahashi | H04W 72/0453 |
| 2020/0344761 A1* | 10/2020 | Amuru | H04L 5/0007 |
| 2020/0367242 A1* | 11/2020 | Moon | H04L 1/00 |
| 2020/0382191 A1* | 12/2020 | Seo | H04L 1/0026 |
| 2021/0112585 A1* | 4/2021 | Ji | H04W 24/02 |
| 2021/0120537 A1* | 4/2021 | Lei | H04L 5/0053 |

FOREIGN PATENT DOCUMENTS

| | | |
|---|---|---|
| CN | 102395206 A | 3/2012 |
| CN | 103297195 A | 9/2013 |
| CN | 103931254 A | 7/2014 |
| CN | 104301065 A | 1/2015 |
| CN | 105338467 A | 2/2016 |
| CN | 105612801 A | 5/2016 |
| WO | WO 2012/159368 A1 | 11/2012 |
| WO | WO2017/026794 A1 | 2/2017 |

OTHER PUBLICATIONS

CATT: "Principle of DL DCI formats design", 3GPP TSG RAN WG1 #86bis, R1-1608793, Lisbon, Portugal, Oct. 10, 2016-Oct. 14, 2016.

VIVO: "Discussion on search space design supporting dynamic DCI size", 3GPP TSG RAN WG1 AH_NR Meeting 2, R1-1710393, Qingdao, P.R. China Jun. 27, 2017-Jun. 30, 2017.

International Search Report related to Application No. PCT/CN2018/084828 dated Jul. 4, 2018.

First CN Office Action related to Application No. 201710314145.2 dated Jul. 10, 2019.

Alcatel-Lucent, Alcatel-Lucent Shanghai Bell: PDSCH and DCI Transmission in LAA, 3GPP TSG RAN WG1 Meeting #82, R1-154578, Beijing, China, Aug. 24, 2015-Aug. 28, 2015.

Chinese Search Report related to Application No. 201710314145.2 dated Apr. 15, 2019.

NTT Docomo, Inc.: "Monitoring of DL control channel for NR", 3GPP TSG RAN WG1 AH_NR Meeting, R1-170620, Spokane, USA Jan. 16, 2017-Jan. 20, 2017.

Indian Examination Report for related Application No. 201927049706; dated Jan. 27, 2021.

* cited by examiner

METHOD FOR TRANSMITTING DOWNLINK CONTROL INFORMATION, TERMINAL, AND NETWORK SIDE DEVICE

CROSS-REFERENCE TO RELATED APPLICATION

This patent application is a 35 USC § 371 U.S. national stage of International Application No. PCT/CN2018/084828 filed on Apr. 27, 2018, which claims a priority to Chinese Patent Application No. 201710314145.2 filed on May 5, 2017, a disclosure of which is incorporated herein by reference in its entirely.

TECHNICAL FIELD

The present disclosure relates to a wireless communication technology, and more particularly, to a method of transmitting downlink control information, a terminal, and a network side device.

BACKGROUND

In a Long Term Evolution (LTE) system, before a terminal device receives or transmits data, the terminal device needs to be informed of Downlink Control Information (DCI) configured by a network side device to the terminal device. The DCI is carried by a Physical Downlink Control Channel (PDCCH).

In a specific communication process, the terminal acquires the DCI by performing blind detection on the PDCCH, then according to a start symbol position of a Physical Downlink Shared Channel (PDSCH) and in conjunction with the DCI carried in the PDCCH, transmits data on the PDSCH.

In a New Radio Access Technology (NR) of the Fifth Generation Mobile Communication (5G), a DCI implementation is arranged more flexibly, for example, a length of the DCI is variable. If a blind detection method in the related art is used for the blind detection to acquire the DCI, an efficiency of the blind detection is low.

SUMMARY

Some embodiments of the present disclosure provide a method of transmitting downlink control information, a terminal, and a network side device, to solve a problem that an efficiency of blind detection is low when an implementation of the DCI is flexibly set.

In a first aspect, some embodiments of the present disclosure provide a method of transmitting downlink control information. The method includes determining, by a terminal, resource configuration information corresponding to a control resource set; acquiring, by the terminal, blind detection information based on a first correspondence relation between the resource configuration information and the blind detection information, wherein the blind detection information includes at least one of: a length of the downlink control information (DCI), an aggregation level of candidate control channels, and a length of a resource allocation (RA) field in the DCI; and receiving, by the terminal based on the blind detection information, DCI transmitted by the network side device on the control resource set.

In a second aspect, some embodiments of the present disclosure provide a method of transmitting downlink control information. The method includes transmitting, by a network side device, first correspondence relation configuration information to a terminal, wherein the first correspondence relation configuration information includes a first correspondence relation between blind detection information and resource configuration information of a resource control set for transmitting downlink control information (DCI), the blind detection information includes at least one of a length of DCI, an aggregation level of candidate control channels and a length of Resource Allocation (RA) field in the DCI; and transmitting, by the network side device, the DCI to the terminal on the control resource set.

In a third aspect, some embodiments of the present disclosure provide a terminal. The terminal includes a processing module, configured to determine resource configuration information corresponding to a control resource set; a blind-detection-information acquisition module, configured to acquire blind detection information based on a first correspondence relation between the resource configuration information and the blind detection information, wherein the blind detection information includes at least one of: a length of the downlink control information (DCI), an aggregation level of candidate control channels, and a length of a resource allocation (RA) field in the DCI; and a reception module, configured to receive, based on the blind detection information, DCI transmitted by the network side device on the control resource set.

In a fourth aspect, some embodiments of the present disclosure provide a network side device. The network side device includes a first transmission module, configured to transmit first correspondence relation configuration information to a terminal, wherein the first correspondence relation configuration information includes a first correspondence relation between blind detection information and resource configuration information of a resource control set for transmitting downlink control information (DCI), the blind detection information includes at least one of a length of DCI, an aggregation level of candidate control channels and a length of Resource Allocation (RA) field in the DCI; and a second transmission module, configured to transmit the DCI to the terminal on the control resource set.

In a fifth aspect, some embodiments of the present disclosure provide a terminal. The terminal includes at least one processor, a storage, at least one network interface, and a bus system, wherein the at least one processor, the storage, and the at least one network interface are coupled together through the bus system, the storage is configured to store an executable program and data, the at least one processor is configured to invoke the program and data stored in the storage to perform the method according to the first aspect.

In a sixth aspect, some embodiments of the present disclosure provide a network side device. The network side device includes at least one processor, a storage, at least one network interface, and a bus system, wherein the at least one processor, the storage, and the at least one network interface are coupled together through the bus system, the storage is configured to store an executable program and data, the at least one processor is configured to invoke the program and data stored in the storage to perform the method according to the second aspect.

In a seventh aspect, some embodiments of the present disclosure provide a non-volatile computer-readable storage medium. The non-volatile computer readable storage medium includes an executable program and data stored on the non-volatile computer-readable storage medium, wherein when the executable program and data are executed by a computer processor, the computer processor implements the method according to the first aspect.

In an eighth aspect, some embodiments of the present disclosure provide a non-volatile computer-readable storage medium. The non-volatile computer readable storage medium includes an executable program and data stored on the non-volatile computer-readable storage medium, wherein when the executable program and data are executed by a computer processor, the computer processor implements the method according to the second aspect.

In the method of transmitting downlink control information, the terminal, and the network side device provided by the present disclosure, the terminal determines resource configuration information corresponding to a control resource set, and acquires at least one of a length of blind downlink control information (DCI), an aggregation level of candidate control channels and a length of Resource Allocation (RA) field in the DCI based on a first correspondence relation between the resource configuration information and the blind detection information. That is, without requiring the network side device to transmit the blind detection information, the terminal may acquire additional resource indication based on the first correspondence relation, and may dynamically acquire updated resource indication based on a change of a resource control set, so that a resource indication manner is more flexible, and the terminal may perform the targeted blind detection based on acquired at least one of the length of the DCI, the aggregation level of candidate control channels, and the length of the Resource Allocation (RA) field in the DCI. The efficiency of the blind detection is improved.

BRIEF DESCRIPTION OF THE DRAWINGS

In order to more clearly illustrate technical solutions in the present disclosure or related art, accompany drawings used in description of embodiments or the related art will be briefly described below. Apparently, the accompany drawings in the following description are some embodiments of the present disclosure. For those of ordinary skills in the art, other drawings may also be acquired from these drawings without paying creative labor.

DETAILED DESCRIPTION

In order to make objectives, technical solutions and advantages of the present disclosure clearer, the technical solutions in some embodiments of the present disclosure will be clearly and completely described below in conjunction with the accompanying drawings in some embodiments of the present disclosure. Obviously, the described embodiments are a part, rather than all, of the embodiments of the present disclosure. Based on the embodiments of the present disclosure, all other embodiments acquired by those of ordinary skills in the art without paying creative work are within the scope of the present disclosure.

Terms such as "include" and "have" and any variations thereof in the specification and claims of the present disclosure are intended to cover a non-exclusive inclusion, for example, a process, a method, a system, a product, a device including a series of steps or units need not be limited to those steps or units clearly listed, but may include other steps or units not clearly listed or inherent to these processes, methods, products or devices.

Figure 1:
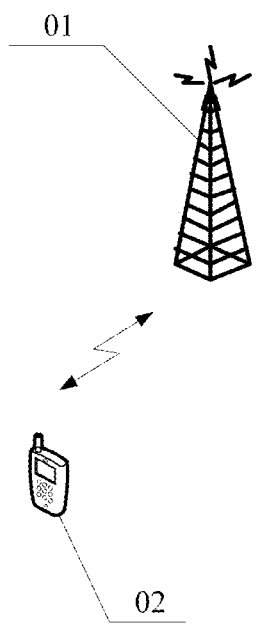
FIG. 1 is a schematic diagram of a system architecture for a method of transmitting downlink control information provided by the present disclosure.

FIG. 1 is a schematic diagram of a system architecture for a method of transmitting downlink control information provided by the present disclosure. The system architecture shown in FIG. 1 includes a network side device 01 and a terminal 02.

The network side device 01 may be a Base Transceiver Station (BTS) in a Global System of Mobile communication (GSM) or a Code Division Multiple Access (CDMA), or may be a NodeB (NB) in Wideband Code Division Multiple Access (WCDMA), or may be an Evolutional Node B (eNB or eNodeB) in Long Term Evolution (LTE), or may also be a base station in a New radio access technology (new RAT or NR), or may be a relay station or an access point, or a base station in a future 5G network, or the like. The present disclosure is not limited thereto.

The terminal 02 may be a wireless terminal or a wired terminal. The wireless terminal may be a device that provides voice and/or other service data connectivity to a user, a handheld device with a wireless connection function being enabled, or another processing device connected to a wireless modem. The wireless terminal may communicate with one or more core networks via a Radio Access Network (RAN), and the wireless terminal may be a mobile terminal, such as a mobile phone (or referred to as a "cellular" phone) and a computer having a mobile terminal, for example, a portable mobile device, a pocket-sized mobile device, a hand-held mobile device, a computer-inbuilt or onboard mobile device, which exchange language and/or data with a wireless access network. For example, a Personal Communication Service (PCS) telephone, a cordless telephone, a Session Initiation Protocol (SIP) phone, a Wireless Local Loop (WLL) station, a Personal Digital Assistant (PDA), or the like. The wireless terminal may also be referred to as a system, a Subscriber Unit, a Subscriber Station, a Mobile Station, a Mobile, a Remote Station, a Remote Terminal, an Access Terminal, a User Terminal, a User Agent, a User Device or a User Equipment. The present disclosure is not limited thereto.

In a wireless communication system, a data channel of a terminal includes a Physical Downlink Shared Channel (PDSCH) for transmitting downlink data and a Physical Uplink Shared Channel (PUSCH) for transmitting uplink data. Both an uplink resource scheduling and a downlink resource scheduling of the data channel need to be notified to the terminal through Downlink Control Information (DCI). The DCI is carried by a Physical Downlink Control Channel (PDCCH).

In particular, in a NR of 5G, a basic time unit of the downlink resource scheduling is one slot. The scheduling within one slot consists of 7 or 14 Orthogonal Frequency Division Multiplexing (OFDM) symbols which are continuous in time. One slot may be divided into a control region and a data region. The PDSCH is transmitted in the data region of the slot, the PDCCH is transmitted in the control region of the slot, and a time-frequency resource in the slot used for the PDSCH is composed of Resource Blocks (RBs). In order to correctly receive the PDSCH, the terminal needs to first demodulate the PDCCH, the DCI carried by the PDCCH contains frequency-domain position information, i.e., downlink resource allocation information, indicating the RBs used for the PDSCH.

Figure 2:
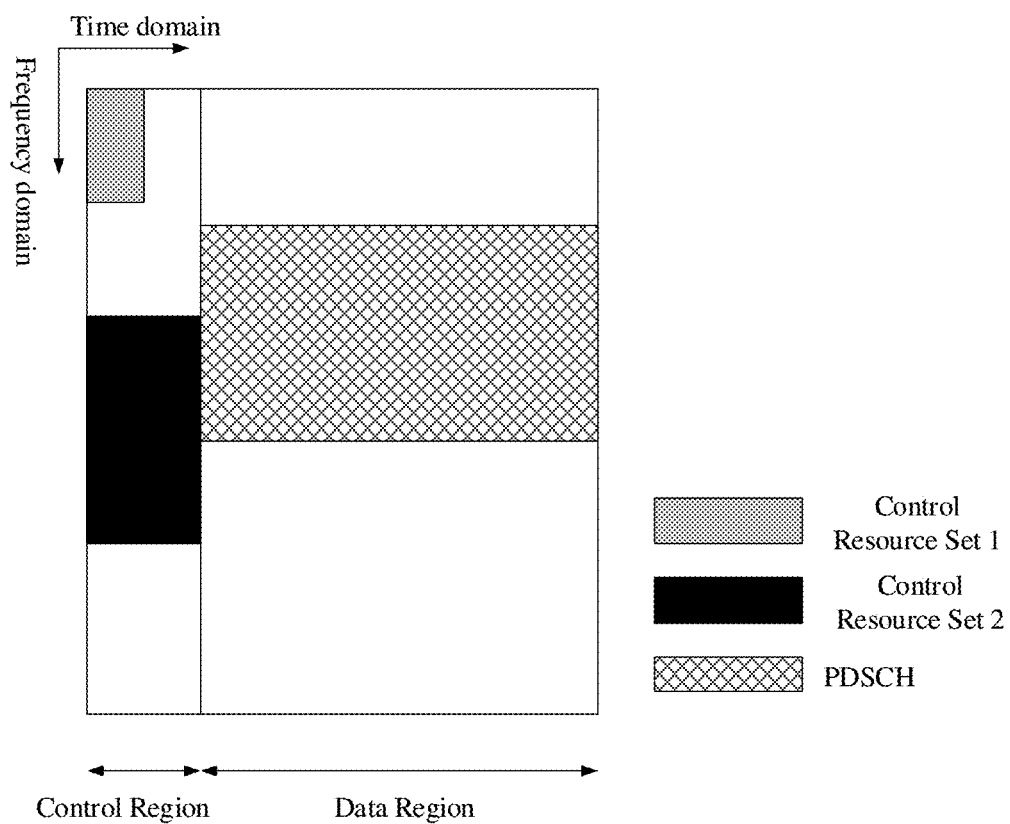
FIG. 2 is a structural schematic diagram of a control resource set.

In the control region of a slot, one or more control resource sets (CORESET) are provided. The terminal may detect the PDCCH in one or more control resource sets. FIG. 2 is a structural schematic diagram of control resource sets. As shown in FIG. 2, a control region and a data region are included in one slot, and there are two control resource sets in the control region of the slot, and resource sizes of the two control resource sets in time domain and in frequency domain may be different.

A PDCCH in the NR is transmitted by using one or more (e.g., 1, 2, 4, 8) Control Channel Elements (CCEs). That is, a mapping of the PDCCH in the NR to time-frequency resources is based on a structure of a CCE, and a basic resource unit constituting the CCE is a Resource Element Group (REG). A CCE is composed of a certain number of REGs (e.g., 6 REGs). A REG includes a RB in frequency domain (i.e. 12 consecutive subcarriers) and an Orthogonal Frequency Division Multiplexing (OFDM) symbol in time domain.

There are many arrangements of REGs in a CCE which may be implemented specifically through a mapping mode and an interleaving mode of the REGs. The mapping mode and the interleaving mode of the REGs will be described below.

Figure 3:
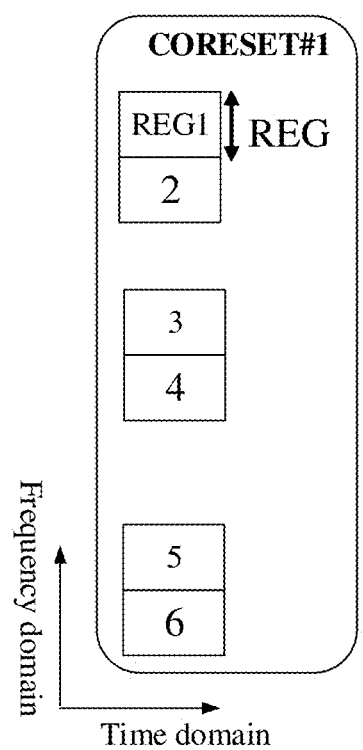
FIG. 3 is a schematic diagram of a Frequency-first mapping mode according to some embodiments of the present disclosure.

The mapping mode of the REGs includes Frequency-first and Time-first. For a Frequency-first mapping mode of a CCE to a REG, a mapping order of time-frequency resources of REGs constituting the CCE is frequency-domain-first and time-domain-second. The Frequency-first mapping mode has many specific mapping modes according to mapping of REGs to different frequency domains. FIG. 3 is a schematic diagram of a Frequency-first mapping mode according to some embodiments of the present disclosure. As shown in FIG. 3, six REGs are mapped to different frequency domains corresponding to a same time domain. FIG. 3 is only one of a variety of Frequency-first mapping modes.

Figure 4:
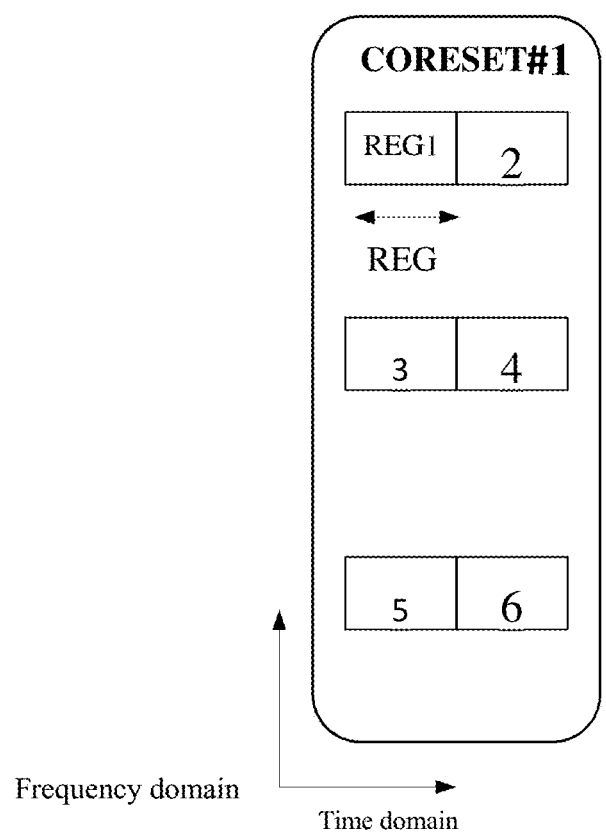
FIG. 4 is a schematic diagram of a Time-first mapping mode according to some embodiments of the present disclosure.

For a Time-first mapping mode of a CCE to a REG, a mapping order of time-frequency resources of REGs composing a CCE is time-domain-first and frequency-domain-second. The Time-first mapping mode has many specific mapping modes according to mapping of REGs to different time domains. FIG. 4 is a schematic diagram of a Time-first mapping mode according to some embodiments of the present disclosure. As shown in FIG. 4, REGs are mapped to two time-domain resources firstly, and then mapping in frequency-domain resources is performed. FIG. 4 is only one of a variety of Time-first mapping modes.

Figure 5:
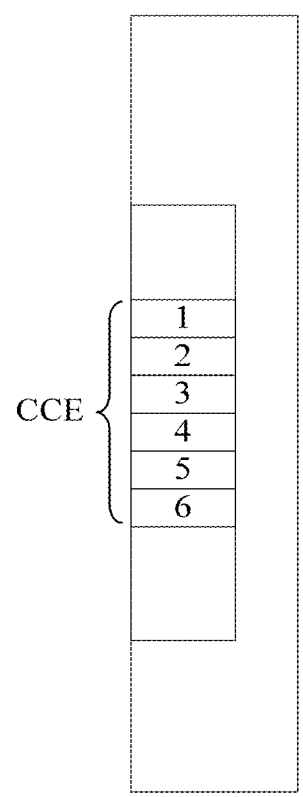
FIG. 5 is a schematic diagram of a localized interleaving mode according to some embodiments of the present disclosure.

An interleaving mode of REGs includes a Distributed interleaving mode and a Localized interleaving mode. For the Localized interleaving mode of a CCE to a REG, an interleaving of REGs constituting a CCE in frequency domain is continuous. FIG. 5 is a schematic diagram of a Localized interleaving mode in some embodiments of the present disclosure. As shown in FIG. 5, the CCE is composed of 6 consecutive REGs.

Figure 6:
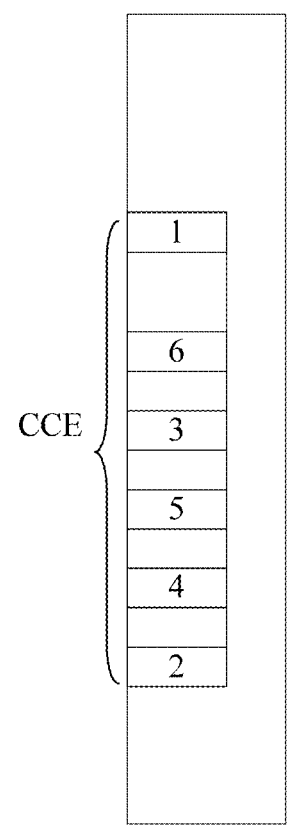
FIG. 6 is a schematic diagram of a distributed interleaving mode according to some embodiments of the present disclosure.

For a Distributed interleaving mode of a CCE to a REG, an interleaving of REGs constituting a CCE in frequency domain is discontinuous. FIG. 6 is a schematic diagram of a Distributed interleaving mode in some embodiments of the present disclosure. As shown in FIG. 6, the CCE is composed of 6 discontinuous REGs. It may be understood by those skilled in the art that the Distributed interleaving mode of REGs may be diversified, and the present disclosure is not particularly limited thereto.

In a LTE system, resources used for the PDSCH may be determined according to a following method and configuration: a bitmap in the DCI of the PDCCH is used to indicate a position of a Resource Block Group (RBG) allocated to the PDSCH, wherein the RBG is a set of continuous RBs in frequency domain. A size of a RBG (i.e., the number of RBs included in each RBG) is related to a downlink system bandwidth $N_{RB}^{DL}$ as shown in Table 1:

TABLE 1

| System bandwidth $N_{RB}^{DL}$ | RBG size (P) |
| --- | --- |
| ≤10 | 1 |
| 11-26 | 2 |
| 27-63 | 3 |
| 64-110 | 4 |

For a system bandwidth $N_{RB}^{DL}$ and a RBG having a size P, a corresponding Resource Assignment (RA) field, i.e., the bitmap, contains a total of $\lceil N_{RB}^{DL}/P \rceil$ bits, and each bit corresponds to one RBG. If a certain RBG is allocated to the PDSCH, a corresponding bit in the bitmap is set to 1; otherwise, the corresponding bit is set to 0.

For example, in case of the system bandwidth $N_{RB}^{DL}=25$ RBs, it may be acquired by searching the table that a size P of the RBG is 2, i.e., P=2, then the bitmap contains a total of $\lceil N_{RB}^{DL}/P \rceil=13$ bits, and each bit represents two frequency-domain continuous RBs corresponding to one RBG. Assuming that a resources allocation bitmap for the PDSCH is 1001110100010, then the PDSCH is allocated to RBG resources numbered 0, 3, 4, 5, 7, 11.

In the 5G NR, an implementation of the DCI is set more flexibly, and the length of the DCI may be changed according to different scenarios, i.e., different DCIs have different lengths. In addition, a length of the Resource Allocation (RA) field in the DCI is also variable, and the RA is the bitmap in the DCI. Meanwhile, an aggregation level of candidate control channels also includes a plurality of types, for example, aggregation levels 1, 2, 4, 8. If the terminal adopts the blind detection method in the related art, the terminal needs to perform the blind detection according to the lengths of all DCIs, all RA lengths, and all aggregation levels, which will result in a very low efficiency of the blind detection.

Some embodiments of the present disclosure provide a method of transmitting downlink control information, wherein additional blind detection information are carried through a CORESET resource or different mapping modes or interleaving modes of REGs, so as to reduce the number of times of the blind detection, improve an efficiency of the blind detection. The following description is provided by using detailed examples.

Figure 7:
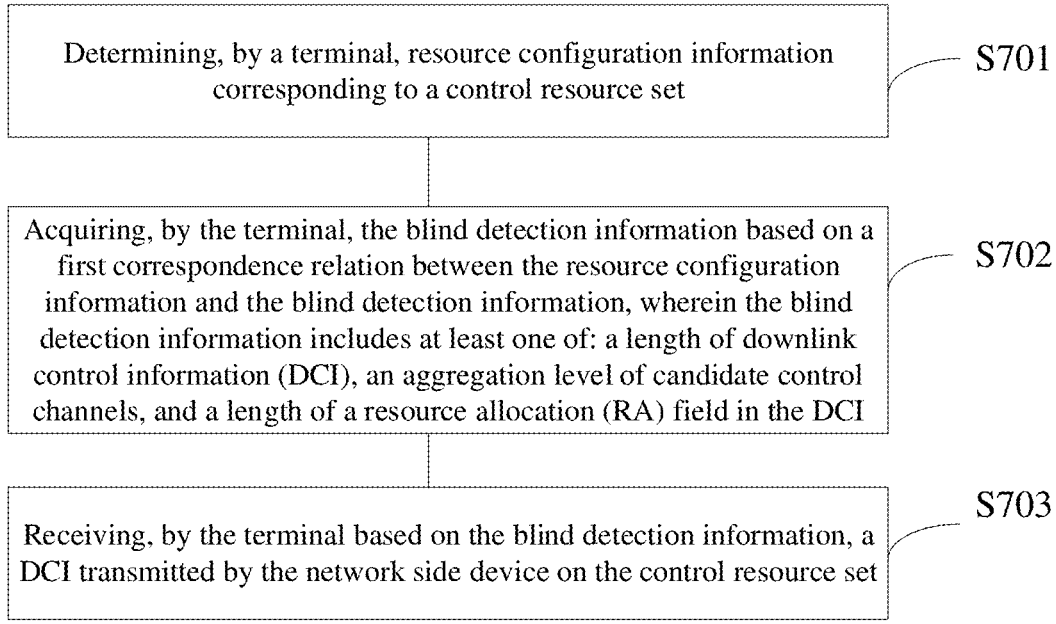
FIG. 7 is a flowchart of a method of transmitting downlink control information provided by some embodiments of the present disclosure.

FIG. 7 is a flowchart of a method of transmitting downlink control information provided by some embodiments of the present disclosure. An execution entity of the transmission method is the terminal in the above embodiment, and as shown in FIG. 7, the method includes steps S701-S703.

S701: determining, by the terminal, resource configuration information corresponding to a control resource set.

In a specific implementation process, as shown in FIG. 2, there may be one or more control resource sets available to the terminal. The resource configuration information of each of the control resource sets available to the terminal may be pre-defined; or a correspondence relation between the resource configuration information and one or more of a system bandwidth, a subcarrier spacing, an antenna configuration, and a carrier frequency may be pre-defined, and the terminal may determine the resource configuration information of each of the available control resource sets according to the correspondence relation.

Optionally, the terminal may also receive resource configuration information corresponding to each of the at least one control resource set transmitted by the network side device. Specifically, the network side device may transmit the resource configuration information corresponding to each control resource set to the terminal through a higher-layer signaling, or the network side device may transmit the resource configuration information corresponding to each of the control resource sets to the terminal through a broadcast channel, system information, or the like. In this embodiment, a specific implementation that the network side device transmits the resource configuration information to the terminal is not particularly limited.

After the terminal acquires the resource configuration information corresponding to each control resource set, the terminal monitors at least one control resource set according to the resource configuration information corresponding to each control resource set, so as to determine a control resource set for transmitting the DCI. Specifically, the resource configuration information includes an identifier of a control resource set, the identifier of the control resource set is used to indicate a time-domain position and/or a frequency-domain position of the control resource set. The terminal monitors the time-domain position and/or the frequency-domain position of each control resource set so as to determine a control resource set of the DCI for the terminal, the process is equivalent to a blind detection process. That is, the control resource set of the DCI for the terminal is determined by the blind detection process.

After the terminal determines the control resource set for transmitting the DCI, the terminal determines resource configuration information corresponding to the control resource set according to the control resource set for transmitting the DCI. That is, in this embodiment, the resource configuration information determined by the terminal is resource configuration information of a control resource set for transmitting the DCI to the terminal.

S702: acquiring, by the terminal, the blind detection information based on a first correspondence relation between the resource configuration information and the blind detection information, wherein the blind detection information includes at least one of: a length of downlink control information (DCI), an aggregation level of candidate control channels, and a length of a resource allocation (RA) field in the DCI.

The resource configuration information may include an identifier of a control resource set, and the identifier of the control resource set is used for indicating a time-domain position and/or a frequency-domain position of the control resource set. The identifier may be, for example, the numbering of the control resource set. For example, a numbering 1 and a numbering 2 of control resource sets shown in FIG. 2 indicate different control resource sets. Those skilled in the art will appreciate that different control resource sets may be configured with overlapping resources.

The resource configuration information may include a mapping mode of REGs in the control resource set, as described above with reference to FIG. 3 and FIG. 4.

The resource configuration information may include an interleaving mode of REGs in the control resource set, as described above with reference to FIG. 5 and FIG. 6.

In the embodiment shown in FIG. 7, a length of the downlink control information (DCI) is no longer fixed. Different DCI formats may have different lengths of the DCIs. Optionally, a same DCI format may have different lengths. The DCI is provided with a Resource Allocation (RA) field for indicating RBG resources allocated to the PDSCH, as described in Table 1 above. A length of the RA field is also variable. An aggregation level of candidate control channels may include 1, 2, 4, 8, and the like.

In the embodiment shown in FIG. 7, the resource configuration information and the blind detection information have a first correspondence relation. That is, at least one of the identifier of the control resource set, the mapping mode of REGs, and the interleaving mode of REGs has a correspondence relation with at least one of the length of the DCI, the aggregation level of the candidate control channels, and the length of the RA.

The terminal may acquire the length of the DCI, the aggregation level of the candidate control channels, the length of the RA, and the like, based on the first correspondence relation.

The first correspondence relation may be predefined by a protocol, or may be transmitted to the terminal by the network side device.

S703: receiving, by the terminal based on the blind detection information, a DCI transmitted by the network side device on the control resource set.

After the terminal acquires the blind detection information, the terminal may perform detection based on the blind detection information, so as to receive the DCI transmitted by the network side device on the control resource set. Specifically, the terminal does not need to perform the blind detection with respect to all lengths of DCIs, all aggregation levels of candidate control channels, and all lengths of RAs, but the terminal only needs to perform a targeted blind detection with respect to the length of the DCI, the aggregation level of candidate control channels and the length of RA determined based on the first correspondence relation, to reduce the number of times of blind detection and improve the efficiency of blind detection.

In the method of transmitting downlink control information provided by the present disclosure, the terminal determines resource configuration information corresponding to a control resource set, and acquires at least one of a length of blind downlink control information (DCI), an aggregation level of candidate control channels and a length of Resource Allocation (RA) field RA in the DCI based on a first correspondence relation between the resource configuration information and the blind detection information. That is, without requiring the network side device to transmit the blind detection information, the terminal may acquire additional resource indication based on the first correspondence relation, and may dynamically acquire updated resource indication based on a change of a resource control set, so that a resource indication manner is more flexible, and the terminal may perform the targeted blind detection based on acquired at least one of the length of the DCI, the aggregation level of candidate control channels, and the length of the Resource Allocation (RA) field in the DCI. The efficiency of the blind detection is improved.

Figure 8:
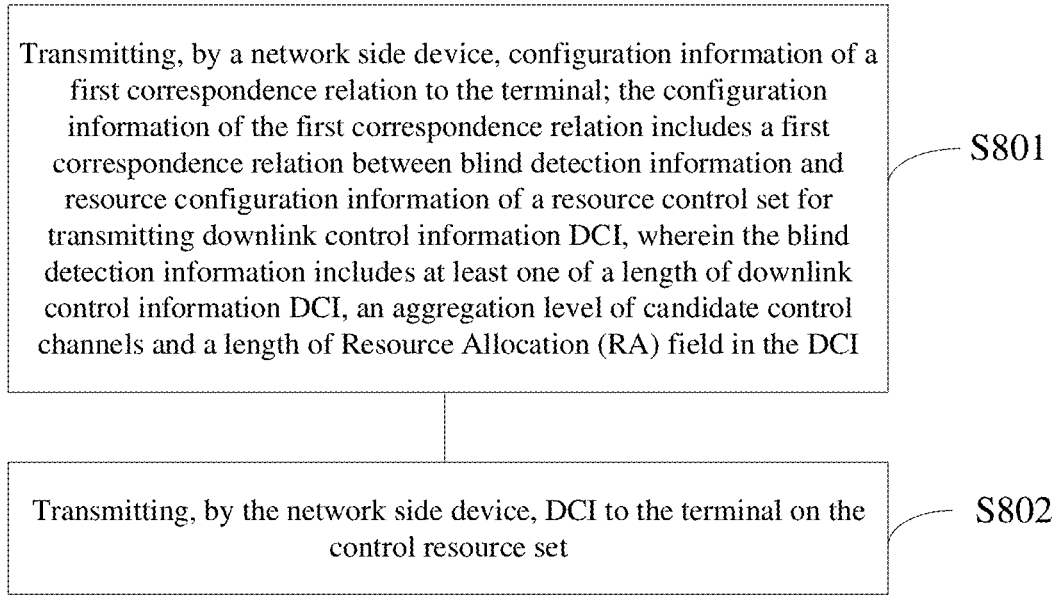
FIG. 8 is a flowchart of a method of transmitting downlink control information provided by some embodiments of the present disclosure.

FIG. 8 is a flowchart of a method of transmitting downlink control information provided by some embodiments of the present disclosure. An execution entity of the method is a network side device described above, and as shown in FIG. 8, the method includes S801-S802.

S801: transmitting, by the network side device, configuration information of a first correspondence relation to the terminal. The configuration information of the first correspondence relation includes a first correspondence relation between blind detection information and resource configuration information of a resource control set for transmitting downlink control information DCI, wherein the blind detection information includes at least one of a length of downlink control information DCI, an aggregation level of candidate control channels and a length of Resource Allocation (RA) field in the DCI.

S802: transmitting, by the network side device, DCI to the terminal on the control resource set.

The network side device transmits at least one piece of resource configuration information corresponding to at least one control resource set to the terminal. The network side device subsequently transmits DCI to the terminal on one of the at least one control resource set.

The network side device may also transmit the first correspondence relation between the resource configuration information of the control resource set and the blind detection information to the terminal. A specific implementation of the first correspondence relation may be obtained from the above description with reference to FIG. 7, and the present disclosure is not particularly limited herein.

It may be understood by those skilled in the art that the above two kinds of information may be transmitted by a higher-layer signaling, or may be transmitted by two higher-layer signalings, respectively. A specific transmission process of the above two kinds of information in this embodiment is not particularly limited.

The network side device transmits DCI to the terminal on one of the control resource sets allocated to the terminal. A specific process of acquiring the DCI by the terminal may be obtained from the above description in conjunction with FIG. 7, and is not repeated in the present disclosure.

In the present disclosure, the network side device transmits configuration information of the first correspondence relation to the terminal, wherein the configuration information of the first correspondence relation includes the first correspondence relation between resource configuration information of a control resource set for transmitting downlink control information DCI and blind detection information, wherein the blind detection information includes at least one of a length of downlink control information DCI, an aggregation level of candidate control channels, and a length of a Resource Allocation (RA) field in the DCI; the network side device transmits DCI to the terminal on a control resource set, that is, the network side device indicates to the terminal a targeted range of the blind detection, thereby reducing the number of times of blind detection performed by the terminal and improving the efficiency of the blind detection.

Hereinafter, a specific implementation of the first correspondence relation will be described in detail by using a specific embodiment.

In one possible implementation, the resource configuration information includes an identifier of a control resource set, and the first correspondence relation includes at least one correspondence relation of the following: a correspondence relation between the identifier of the control resource set and a length of DCI; a correspondence relation between the identifier of the control resource set and an aggregation level of candidate control channels; and a correspondence relation between the identifier of the control resource set and a length of a RA.

Those skilled in the art may understand that, since the resource configuration information includes the identifier of the control resource set, when the resource configuration information includes only the identifier of the control resource set, the resource configuration information may be equivalent to the identifier of the control resource set. In such a case, a concept of the resource configuration information may not be introduced, and the network side device may directly transmit the identifier of the control resource set corresponding to each of the at least one control resource set to the terminal, or the identifier of the control resource set corresponding to each of the at least one control resource set may be agreed through a protocol.

The terminal determines the identifier corresponding to the control resource set, and the terminal acquires the blind detection information based on a first correspondence relation between the identifier of the control resource set and the blind detection information.

Specifically, identifiers of different control resource sets correspond to different lengths of DCI, and an identifier of each control resource set corresponds to at least one length of DCI. For example, an identifier 1 of a control resource set may correspond to two lengths of DCI which are A bits and B bits, respectively, and an identifier 2 of a control resource set may correspond to three lengths of DCI which are C bits, D bits, and E bits, respectively. Those skilled in the art may understand that the identifier 1 of the control resource set and the identifier 2 of the control resource set correspond to different lengths of DCI, which may also be understood to be a case that the lengths of DCI corresponding to the identifier 1 and the identifier 2 may be completely or partially different.

In a case that the terminal determines that the control resource set for transmitting DCI is a control resource set 1, the terminal only needs to perform blind detection with respect to lengths of DCI being A bits and B bits, without needing to perform blind detection with respect to lengths of DCI being C bits, D bits, and E bits. Thus, the number of times of blind detection is reduced and the efficiency of blind detection is improved.

Different identifiers of control resource sets correspond to different aggregation levels of candidate control channels, and each identifier of a control resource set correspond to at least one aggregation level of candidate control channels. For example, an identifier 1 of a control resource set corresponds to aggregation levels 1 and 2 of candidate control channels, and an identifier 2 of a control resource set corresponds to aggregation levels 4 and 8 of candidate control channels. Those skilled in the art may understand that the identifier 1 of a control resource set and the identifier 2 of a control resource set corresponds to different aggregation levels of candidate control channels, which may also be understood to be a case that the aggregation levels of candidate control channels corresponding to the two identifiers may be completely or partially different.

In a case that the terminal determines that the control resource set for transmitting DCI is the control resource set 1, the terminal only needs to perform blind detection with respect to the aggregation levels 1 and 2 of candidate control channels, without needing to perform blind detection with respect to the aggregation levels 4 and 8 of the candidate control channels. Thus, the number of times of blind detection is reduced, and the efficiency of blind detection is improved.

Different identifiers of control resource sets correspond to different lengths of RAs, and each identifier of a control resource set corresponds to respective lengths of at least one RA. For example, the identifier 1 of a control resource set may correspond to two lengths of the RA which are F bits and G bits, respectively, and the identifier 2 of a control resource set may correspond to three lengths of the RA, which are H bits, I bits, and J bits, respectively. Those skilled in the art may understand that the identifier 1 of the control resource set and the identifier 2 of the control resource set correspond to different lengths of RA, which may also be understood as a case that the lengths of RA corresponding to the two identifiers may be completely or partially different.

When the terminal determines that the control resource set for transmitting DCI is the control resource set 1, the terminal only needs to perform blind detection with respect to the lengths of RA being F bits and G bits, without needing to perform blind detection with respect to the lengths of RA being H bits, I bits and J bits. Thus, the number of times of blind detection is reduced, and the efficiency of blind detection is improved.

In one possible implementation, the resource configuration information includes an interleaving mode of Resource Element Groups (REGs) in a control resource set, and the first correspondence relation includes at least one correspondence relation of the following: a correspondence relation between the interleaving mode of REGs and a length of DCI; a correspondence relation between the interleaving mode of REGs and an aggregation level of candidate control channels; and a correspondence relation between the interleaving mode of REGs and a length of RA.

Those skilled in the art may understand that, since the resource configuration information includes an interleaving mode of REGs in a control resource set, when the resource configuration information includes only the interleaving mode of REGs in the control resource set, the resource configuration information may be equivalent to the interleaving mode of REGs in the control resource set. In such a case, a concept of the resource configuration information may not be introduced, and the network side device may directly transmit the interleaving mode of REGs corresponding to each of at least one control resource set to the terminal, or the interleaving mode of REGs corresponding to each of at least one control resource set may be agreed through a protocol.

The terminal determines the interleaving mode of REGs corresponding to a control resource set, and the terminal acquires the blind detection information based on the first correspondence relation between the interleaving mode of REGs corresponding to the control resource set and the blind detection information.

As may be seen from FIG. 5 and FIG. 6, the interleaving mode of REGs may have multiple types, and different interleaving modes correspond to different lengths of DCI, and each interleaving mode corresponds to at least one length of DCI; different interleaving modes correspond to different aggregation levels of control channels, and each interleaving mode corresponds to at least one aggregation level; different interleaving modes correspond to different lengths of RA, and each interleaving mode corresponds to at least one length of RA. In a specific implementation process, various interleaving modes may be represented by identifiers of the interleaving modes; and correspondence relations between an interleaving mode and a length of DCI, between an interleaving mode and an aggregation level of candidate control channels, and between an interleaving mode and a length of RA, are similar to the correspondence relations between an identifier of a control resource set and a length of DCI, between an identifier of a control resource set and an aggregation level of candidate control channels, and between an identifier of a control resource set and a length of RA, and a detailed description of the correspondence relations may be obtained from the above embodiments, and is not repeated in this embodiment.

In one possible implementation, the resource configuration information includes a mapping mode of Resource Element Group (REG) in a control resource set, and the first correspondence relation includes at least one correspondence relation of the following: a correspondence relation between a mapping mode of a REG and a length of DCI; a correspondence relation between a mapping mode of REGs and an aggregation level of control channels, and a correspondence relation between a mapping mode of REGs and a length of RA.

Those skilled in the art may understand that, since the resource configuration information includes a mapping mode of REGs in a control resource set, when the resource configuration information includes only the mapping mode of REGs in the control resource set, the resource configuration information may be equivalent to the mapping mode of REGs in the control resource set. In such a case, a concept of the resource configuration information may not be introduced, and the network side device may directly transmit a mapping mode of REGs corresponding to each of at least one control resource set to the terminal, or the mapping mode of REGs corresponding to each of at least one control resource set may be agreed through a protocol.

The terminal determines the mapping mode of REGs corresponding to a control resource set, and the terminal acquires the blind detection information based on the first correspondence relation between the mapping mode of REGs corresponding to the control resource set and the blind detection information.

As may be seen from FIG. 3 and FIG. 4, the mapping mode of REGs may have multiple types, and different mapping modes correspond to different lengths of DCI, and each mapping mode corresponds to at least one length of DCI; different mapping modes correspond to different aggregation levels of control channels, and each mapping mode corresponds to at least one aggregation level; different mapping modes correspond to different lengths of RA, and each mapping mode corresponds to at least one length of RA. In a specific implementation process, various mapping modes may be represented by identifiers of the mapping modes; and correspondence relations between a mapping mode and a length of DCI, between a mapping mode and an aggregation level of candidate control channels, and between a mapping mode and a length of RA, are similar to the correspondence relations between an identifier of a control resource set and a length of DCI, between an identifier of a control resource set and an aggregation level of candidate control channels, and between an identifier of a control resource set and a length of RA, and a detailed description of the correspondence relations may be obtained from the above embodiments, and is not repeated in this embodiment.

Those skilled in the art may understand that, in the above implementations, the network side device may directly transmit the first correspondence relation between the blind detection information and at least one of an identifier, an interleaving mode of REGs, and a mapping mode of REGs corresponding to each of at least one control resource set to the terminal, or the mapping mode of REGs corresponding to each of at least one control resource set may be agreed through a protocol.

The terminal determines at least one of an identifier, an interleaving mode of REGs, and a mapping mode of REG corresponding to a control resource set, and then determines blind detection information based on the first correspondence relation.

Optionally, in the description made in conjunction with FIG. 7 and FIG. 8, the blind detection information includes the length of DCI, the DCI includes the Resource Allocation (RA) field. In such a case, the length of RA is not included in the blind detection information.

After the terminal acquires the length of DCI based on the first correspondence relation, the terminal acquires the length of RA based on a second correspondence relation between a length of DCI and a length of RA.

The terminal receives, according to the length of DCI and the length of RA, DCI transmitted by the network side device on the control resource set.

The second correspondence relation may be predetermined by a protocol; or the network side device may transmit configuration information of a second correspondence relation to the terminal, and the terminal may receive the configuration information of the second correspondence relation transmitted by the network side device, wherein the configuration information of the second correspondence relation includes the second correspondence relation.

In the method provided by the present disclosure, a more direct correspondence relation is established between a length of DCI and a length of RA, and a length of one DCI corresponds to a length of one RA, so that the terminal needs to perform blind detection according to the length of one RA, and thus the number of times of blind detection is reduced and the efficiency of blind detection is improved.

Optionally, on a basis of the above embodiment, after the terminal acquires the length of RA, the terminal may determine a system bandwidth or the size of a RBG for transmitting the PDSCH according to the length of the RA. Referring to the embodiment corresponding to Table 1, for the system bandwidth $N_{RB}^{DL}$, for the RBG having the size P, the corresponding bitmap contains a total of $\lceil N_{RB}^{DL}/P \rceil$ bits, and each bit corresponds to one RBG.

The length of RA is the number of bits contained in the bitmap. When the system bandwidth is known to be 100 RBs, if the bitmap has 25 bits, the size of a RBG is known to be 4, i.e., one RBG contains 4 RBs. When the size of a RBG is known to be 3, if the bitmap has 20 bits, then the system bandwidth may be known to be 60 RBs.

The terminal acquires the size of a RBG or the system bandwidth according to the RA, so that the terminal may perform a targeted reception of data transmitted on the PDSCH.

Figure 9:
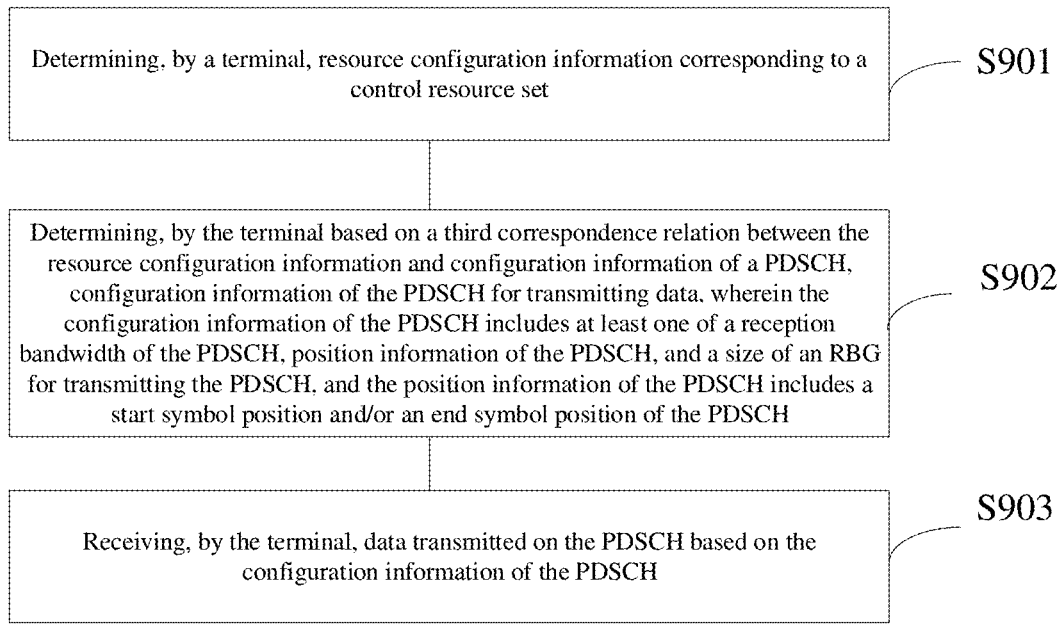
FIG. 9 is a flowchart of a method of transmitting downlink control information provided by some embodiments of the present disclosure.

FIG. 9 is a flowchart of a method of transmitting downlink control information provided by some embodiments of the present disclosure. As shown in FIG. 9, an execution entity of the method is the terminal described above, and the method includes S901-S903.

S901: determining, by the terminal, resource configuration information corresponding to a control resource set.

S902: determining, by the terminal based on a third correspondence relation between the resource configuration information and configuration information of a PDSCH, configuration information of the PDSCH for transmitting data, wherein the configuration information of the PDSCH includes at least one of a reception bandwidth of the PDSCH, position information of the PDSCH, and a size of an RBG for transmitting the PDSCH, and the position information of the PDSCH includes a start symbol position and/or an end symbol position of the PDSCH.

S903: receiving, by the terminal, data transmitted on the PDSCH based on the configuration information of the PDSCH.

An implementation of S901 may be obtained from related description of S701 in FIG. 7, which will not be repeated herein.

In the present disclosure, the resource configuration information of the control resource set further has a third correspondence relation with the configuration information of the PDSCH. The third correspondence relation may be pre-agreed by a protocol. Configuration information of the third correspondence relation may also be transmitted by the network side device to the terminal, and the terminal may receive the configuration information of the third correspondence relation transmitted by the network side device.

The configuration information of the PDSCH includes at least one of a reception bandwidth of the PDSCH, position information of the PDSCH, and a size of an RBG for transmitting the PDSCH. The resource configuration information includes at least one of an identifier of a control resource set, a mapping mode of REGs, an interleaving mode of REGs, i.e., at least one of the identifier of the control resource set, the mapping mode of REGs, and the interleaving mode of REGs has a correspondence relation with at least one of the reception bandwidth of the PDSCH, the position information of the PDSCH, and the size of the RBG for transmitting the PDSCH.

The terminal may adjust a radio frequency bandwidth of the terminal based on the reception bandwidth of the PDSCH. The terminal may receive data at a corresponding position of the PDSCH based on the position information of the PDSCH. After the terminal determines the size of the RBG, the terminal may determine the system bandwidth based on the size of the RBG and a length of a bitmap in DCI. For example, in conjunction with description of the embodiment corresponding to Table 1 above, the size of the RBG is P=2, the length of the bitmap in the DCI is 13 bits, and the system bandwidth is 26 RBs.

The terminal may also perform targeted reception of data based on the DCI acquired in the above embodiment and the acquired configuration information of the PDSCH, so that the terminal may receive data transmitted on the PDSCH in a power-saving manner and in a fast manner.

Those skilled in the art may understand that the implementation of acquiring DCI in the present disclosure may be the above-mentioned implementation of acquiring DCI, and in a specific implementation process, the DCI may also be acquired in other ways. The present disclosure does not particularly limit the implementation of acquiring DCI. After the terminal acquires the configuration information of the PDSCH, the terminal may receive data transmitted on the PDSCH based on the configuration information of the PDSCH and the acquired DCI.

In the present disclosure, the terminal determines configuration information of a PDSCH for transmitting data based on a third correspondence relation between resource configuration information and the configuration information of the PDSCH, wherein the configuration information of the PDSCH includes at least one of a reception bandwidth of the PDSCH, position information of the PDSCH, and a size of a RBG for transmitting the PDSCH, and the position information of the PDSCH includes a start symbol position and/or an end symbol position of the PDSCH. The terminal may acquire additional resource indication based on the resource configuration information, i.e. acquire the configuration information of the PDSCH, and may dynamically acquire updated resource indication based on a change of a resource control set, so that a manner of indicating a resource is more flexible. Meanwhile, the network side device does not need to transmit the configuration information of the PDSCH in other ways, thus reducing a signaling overhead; and the terminal may perform targeted reception of data based on the acquired configuration information of the PDSCH.

The third correspondence relation described above will be described in detail below by using specific embodiments.

In one possible implementation, the resource configuration information includes an identifier of a control resource set, and the third correspondence relation includes at least one correspondence relation of the following: a correspondence relation between an identifier of a control resource set and a reception bandwidth of the PDSCH; a correspondence relation between an identifier of a control resource set and position information of a PDSCH; and a correspondence relation between an identifier of a control resource set and a size of RBGs used for transmitting the PDSCH.

Those skilled in the art may understand that, since the resource configuration information includes an identifier of a control resource set, when the resource configuration information includes only the identifier of the control resource set, the resource configuration information may be equivalent to the identifier of the control resource set. In such a case, a concept of the resource configuration information may not be introduced, and the network side device may directly transmit the identifier corresponding to each of at least one control resource set to the terminal, or the identifier corresponding to each of at least one control resource set may be agreed through a protocol.

The terminal determines an identifier corresponding to the control resource set, and acquires the configuration information of the PDSCH based on a third correspondence relation between the identifier of the control resource set and the configuration information of the PDSCH.

Different identifiers of control resource sets correspond to different reception bandwidths of the PDSCH, and an identifier of each control resource set corresponds to at least one reception bandwidth of the PDSCH. For example, an identifier 1 of a control resource set may correspond to two different reception bandwidths. When the terminal determines that a control resource set for transmitting DCI is the control resource set 1, the terminal only needs to perform blind detection with respect to two reception bandwidths, thereby reducing the number of times of blind detection and improving the efficiency of blind detection.

Different identifiers of control resource sets correspond to different position information of PDSCH, and an identifier of each control resource set corresponds to at least one piece of position information of the PDSCH. For example, an identifier 1 of a control resource set corresponds to two pieces of position information, and an identifier 2 of a control resource set corresponds to three pieces of position information. When the terminal determines that the control resource set for transmitting DCI is the control resource set 1, the terminal only needs to determine the position of the PDSCH with respect to two pieces of position information.

Different identifiers of control resource sets correspond to different sizes of RBGs, and an identifier of each control resource set corresponds to at least one size of a RBG. For example, an identifier 1 of a control resource set may correspond to two sizes of RBGs, and an identifier 2 of a control resource set may correspond to three sizes of RBGs. When the terminal determines that the control resource set for transmitting DCI is the control resource set 1, the terminal acquires data transmitted on the PDSCH with respect to two sizes of RBGs.

In another possible implementation, the resource configuration information includes an interleaving mode of Resource Element Group (REG) in the control resource set, and the third correspondence relation includes at least one correspondence relation of the following: a correspondence relation between an interleaving mode of REGs and a reception bandwidth of the PDSCH; a correspondence relation between an interleaving mode of REGs and position information of the PDSCH; and a correspondence relation between an interleaving mode of REGs and a size of the RBG used for transmitting the PDSCH.

Those skilled in the art may understand that, since the resource configuration information includes an interleaving mode of REGs in a control resource set, when the resource configuration information includes only the interleaving mode of REGs, the resource configuration information may be equivalent to the interleaving mode of REGs. In such a case, a concept of the resource configuration information may not be introduced, and the network side device may directly transmit the interleaving mode of REGs corresponding to each of at least one control resource set to the terminal, or the interleaving mode of REGs corresponding to each of at least one control resource set may be agreed through a protocol.

The terminal determines the interleaving mode of the REG corresponding to the control resource set, and acquires the configuration information of the PDSCH based on the third correspondence relation between the interleaving mode of REGs in the control resource set and the configuration information of the PDSCH.

As may be seen from FIGS. 5 and 6, the interleaving mode of REG has multiple types, and different interleaving modes correspond to different reception bandwidths of the PDSCH, and each interleaving mode corresponds to at least one reception bandwidth of the PDSCH. Different interleaving modes correspond to different pieces of position information of PDSCH, and each interleaving mode corresponds to at least one piece of position information of the PDSCH; different interleaving modes correspond to different sizes of RBGs, and each interleaving mode corresponds to at least one size of RBG. In a specific implementation process, various interleaving modes may be represented by identifiers of the interleaving modes. Correspondence relations between an interleaving mode and a reception bandwidth of a PDSCH, between an interleaving mode and position information of the PDSCH, and between an interleaving mode and a size of a RBG used for transmitting the PDSCH, are similar to the correspondence relations between an identifier of a control resource set and a reception bandwidth of the PDSCH, between an identifier of a control resource set and position information of the PDSCH, and between an identifier of a control resource set and a size of a RBG used for transmitting the PDSCH. Detailed description thereof may be found from the above embodiments, and will not be repeated herein.

In still another possible implementation, the resource configuration information includes a mapping mode of a Resource Element Group (REG) in a control resource set, and the third correspondence relation includes at least one correspondence relation of the following: a correspondence relation between a mapping mode of a REG and a reception bandwidth of a PDSCH; a correspondence relation between a mapping mode of a REG and position information of the PDSCH; and a correspondence relation between a mapping mode of a REG and a size of the RBG used for transmitting the PDSCH.

Those skilled in the art may understand that, since the resource configuration information includes a mapping mode of a REG in a control resource set, when the resource configuration information includes only the mapping mode of a REG, the resource configuration information may be equivalent to the mapping mode of a REG. In such a case, a concept of the resource configuration information may not be introduced, and the network side device may directly transmit the mapping mode of a REG corresponding to each of at least one control resource set to the terminal, or the mapping mode of a REG corresponding to each of at least one control resource set may be agreed through a protocol.

The terminal determines the mapping mode of a REG corresponding to the control resource set, and acquires the configuration information of the PDSCH based on the third correspondence relation between the mapping mode of the REG in the control resource set and the configuration information of the PDSCH.

As may be seen from FIG. 3 and FIG. 4, the mapping mode of a REG has multiple types. Different mapping modes correspond to different reception bandwidths of PDSCH, and each mapping mode corresponds to at least one reception bandwidth of the PDSCH; different mapping modes correspond to different pieces of position information of PDSCH, and each mapping mode corresponds to at least one piece of position information of a PDSCH; and different mapping modes correspond to different sizes of RBGs, and each mapping mode corresponds to at least one size of a RBG. In a specific implementation process, various mapping modes may be represented by identifiers of the mapping modes. Correspondence relations between a mapping mode and a reception bandwidth of the PDSCH, between a mapping mode and position information of the PDSCH, and between a mapping mode and a size of a RBG used for transmitting the PDSCH are similar to correspondence relations between an identifier of a control resource set and a reception bandwidth of the PDSCH, between the identifier of the control resource set and position information of the PDSCH, and between the identifier of the control resource set and the size of the RBG used for transmitting the PDSCH. Detailed description thereof may be found from the above embodiments, and will not be repeated in the present disclosure.

Those skilled in the art may understand that, in the implementation described above, the network side device may directly transmit to the terminal the third correspondence relation between the configuration information of PDSCH and at least one of an identifier, an interleaving mode of REGs, and a mapping mode of a REG corresponding to each of at least one control resource set, or the third correspondence relation between the configuration information of PDSCH and at least one of an identifier, an interleaving mode of REGs, and a mapping mode of a REG corresponding to each of at least one control resource set may be agreed through a protocol.

The terminal determines at least one of the identifier corresponding to the control resource set, the interleaving mode of REGs, and the mapping mode of the REG, and then determines the configuration information of the PDSCH based on the third correspondence relation.

Those skilled in the art may understand that configuration information of the first correspondence relation, configuration information of the second correspondence relation and configuration information of the third correspondence relation transmitted by the network side device in the above embodiments may all be semi-static configuration information. That is, the configuration information transmitted by the network side device to the terminal may last for a period of time, and may be constantly used before the network side device makes an update.

Figure 10:
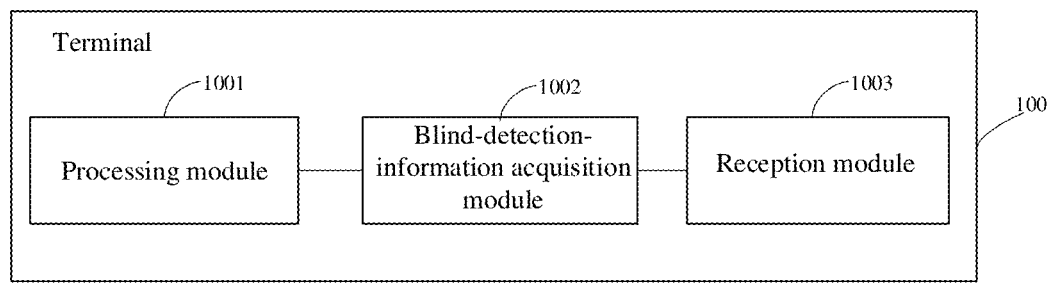
FIG. 10 is a schematic structural diagram of a terminal provided by some embodiments of the present disclosure.

FIG. 10 is a schematic structural diagram of a terminal provided by some embodiments of the present disclosure. As shown in FIG. 10, the terminal 100 includes a processing module 1001, a blind-detection-information acquisition module 1002, and a reception module 1003.

The processing module 1001 is configured to determine resource configuration information corresponding to a control resource set. The blind-detection-information acquisition module 1002 is configured to acquire blind detection information based on a first correspondence relation between the resource configuration information and the blind detection information, wherein the blind detection information includes at least one of: a length of downlink control information (DCI), an aggregation level of candidate control channels, and a length of a Resource Allocation (RA) field in the DCI. The reception module 1003 is configured to receive, based on the blind detection information, DCI transmitted by the network side device on the control resource set.

Optionally, the reception module 1003 is further configured to receive configuration information of a first correspondence relation transmitted by the network side device, wherein the configuration information of the first correspondence relation includes the first correspondence relation.

In the terminal shown in FIG. 10, specific implementations of the first correspondence relation may be obtained from the above embodiments, and will not be repeated herein.

Figure 11:
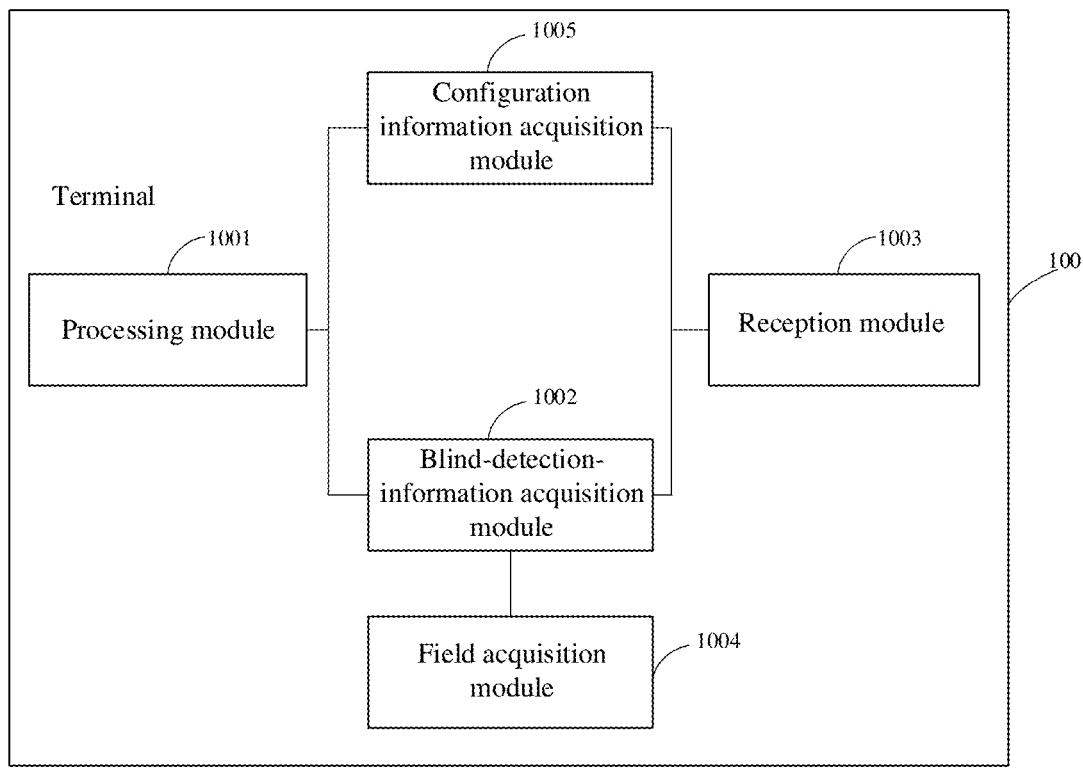
FIG. 11 is a schematic structural diagram of a terminal provided by some embodiments of the present disclosure.

FIG. 11 is a schematic structural diagram of a terminal provided by some embodiments of the present disclosure. On a basis of FIG. 10, when the blind detection information includes a length of DCI and the DCI includes a Resource Allocation (RA) field, the terminal shown in FIG. 11 further includes a field acquisition module 1004 and a configuration information acquisition module 1005.

The field acquisition module 1004 is configured to acquire a length of the RA based on a second correspondence relation between a length of the DCI and a length of the RA. The reception module 1003 is further configured to receive, based on the length of the DCI and the length of the RA, the DCI transmitted by the network side device on the control resource set.

Optionally, the reception module 1003 is further configured to: receive configuration information of a second correspondence relation transmitted by the network side device, wherein the configuration information of the second correspondence relation includes the second correspondence relation.

Optionally, the configuration information acquisition module 1005 is configured to determine, based on a third correspondence relation between the resource configuration information and configuration information of a PDSCH, the configuration information of the PDSCH for transmitting data, wherein the configuration information of the PDSCH includes at least one of a reception bandwidth of the PDSCH, position information of the PDSCH, and a size of a RBG for transmitting the PDSCH; the position information of the PDSCH includes a start symbol position and/or an end symbol position of the PDSCH. The reception module 1003 is further configured to receive, based on the configuration information of the PDSCH and the DCI, data transmitted on the PDSCH.

Optionally, the reception module 1003 is further configured to receive configuration information of a third correspondence relation transmitted by the network side device, wherein the configuration information of the third correspondence relation includes the third correspondence relation.

In the terminal shown in FIG. 11, various specific implementations of the third correspondence relation may be obtained from the above embodiments, and will not be repeated herein.

Optionally, the reception module 1003 is further configured to receive resource configuration information corresponding to each of at least one control resource set transmitted by the network side device. The processing module 1001 is specifically configured to monitor the at least one control resource set based on the resource configuration information corresponding to each of the at least one control resource set so as to determine a control resource set for transmitting the DCI; and determine, based on the control resource set for transmitting the DCI, resource configuration information corresponding to the control resource set.

The terminal provided in FIG. 11 may be used to perform an embodiment of the method described above, and implementation principles and technical effects of the terminal in FIG. 11 are similar to those in the embodiment of the method described above.

Figure 12:
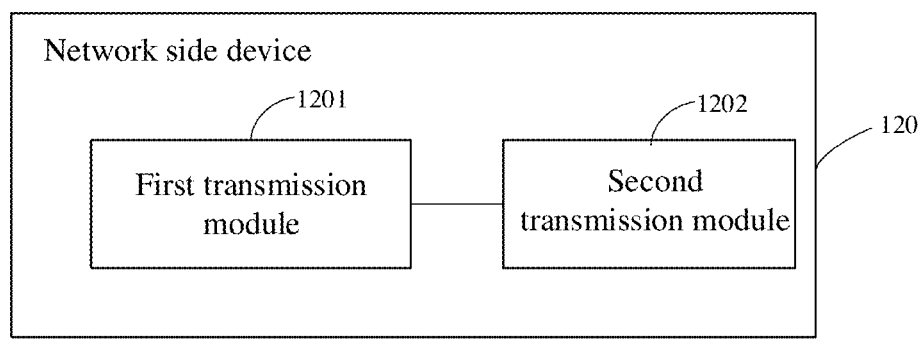
FIG. 12 is a schematic structural diagram of a network side device provided by some embodiments of the present disclosure.

FIG. 12 is a schematic structural diagram of a network side device provided by some embodiments of the present disclosure. As shown in FIG. 12, the network side device 120 includes a first transmission module 1201 and a second transmission module 1202. The first transmission module 1201 is configured to transmit configuration information of a first correspondence relation to a terminal, wherein the configuration information of the first correspondence relation includes a first correspondence relation between blind detection information and resource configuration information of a resource control set for transmitting downlink control information (DCI), wherein the blind detection information includes at least one of a length of downlink control information (DCI), an aggregation level of candidate control channels and a length of Resource Allocation (RA) field in the DCI. The second transmission module 1202 is configured to transmit DCI to the terminal on the control resource set.

In the network side device shown in FIG. 12, various specific implementations of the first correspondence relation may be obtained from the above embodiments, and will not be repeated herein.

Optionally, the blind detection information includes a length of DCI, wherein the DCI includes a Resource Allocation (RA) field. The first transmission module 1201 is further configured to transmit configuration information of a second correspondence relation to the terminal, wherein the configuration information of the second correspondence relation includes the second correspondence relation between a length of the DCI and a length of the RA.

Optionally, the first transmission module 1201 is further configured to transmit configuration information of a third correspondence relation to the terminal, wherein the configuration information of the third correspondence relation includes a correspondence relation between the resource configuration information and configuration information of a PDSCH. The configuration information of the PDSCH includes at least one of: a reception bandwidth of the PDSCH, position information of the PDSCH, a size of a RBG for transmitting the PDSCH, and the position information of the PDSCH includes a start symbol position and/or an end symbol position of the PDSCH.

In the network side device shown in FIG. 12, various specific implementations of the third correspondence relation may be obtained from the above embodiments, and will not be repeated herein.

Optionally, the first transmission module 1201 is further configured to transmit resource configuration information corresponding to each of at least one control resource set to the terminal.

The network side device provided in FIG. 12 may be used to perform the above-described method embodiments, and implementation principles and technical effect of the network side device in FIG. 12 are similar to those in the above method embodiments, and will not be repeated again herein.

Figure 13:
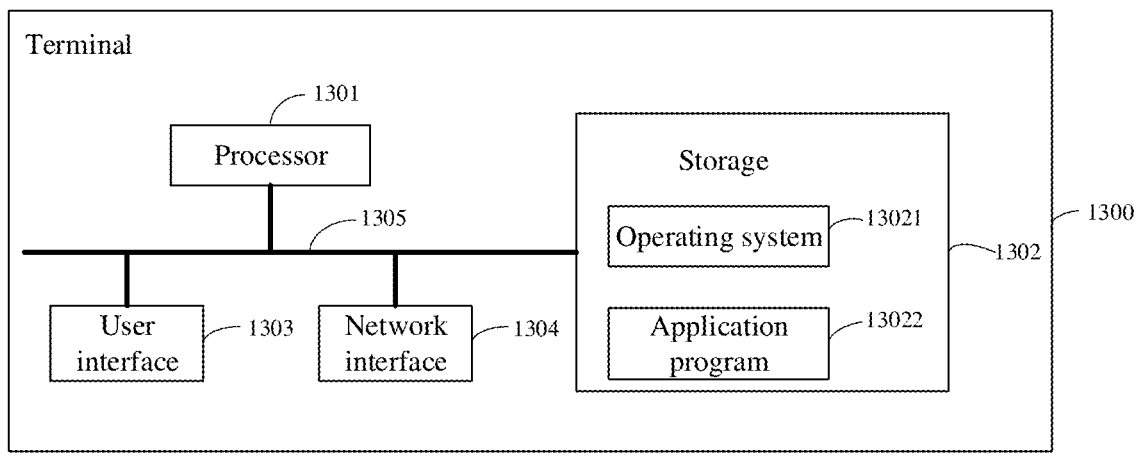
FIG. 13 is a schematic structural diagram of a terminal provided by some embodiments of the present disclosure.

FIG. 13 is a schematic structural diagram of a terminal provided by some embodiments of the present disclosure. As shown in FIG. 13, the terminal 1300 shown in FIG. 13 includes at least one processor 1301, a storage 1302, at least one network interface 1304, and a user interface 1303. Various components in the terminal 1300 are coupled together by a bus system 1305. It will be appreciated that the bus system 1305 is used to enable connection communication among these components. The bus system 1305 includes a data bus, a power bus, a control bus, and a status signal bus. However, for clarity of illustration, various buses are designated as the bus system 1305 in FIG. 13.

The user interface 1303 may include a display, a keyboard, or a pointing device (e.g., a mouse, a trackball, a touch pad, or a touch screen, etc.).

It may be understood that the storage 1302 in some embodiments of the present disclosure may be a volatile storage or a non-volatile storage, or may include both volatile and non-volatile storages. The non-volatile storage may be a Read-Only Memory (ROM), a Programmable ROM (PROM), an Erasable PROM (EPROM), an Electrically EPROM (EEPROM), or a flash memory. The volatile storage may be a Random Access Memory (RAM), which serves as an external cache. By way of example but not limitation, many forms of RAM may be used, such as a Static RAM (SRAM), a Dynamic RAM (DRAM), a Synchronous DRAM (SDRAM), a Double Data Rate SDRAM (DDRSDRAM)), an Enhanced SDRAM (ESDRAM), a Synchronous link DRAM (SLDRAM) and Direct Rambus RAM (DRRAM). The storage 1302 in the systems and methods described by some embodiments of the present disclosure is intended to include, but is not limited to, these and any other suitable types of storages.

In some embodiments, storage 1302 stores elements, executable modules or data structures, or a subset, or an extended set of the following: an operating system 13021 and an application program 13022.

The operating system 13021 includes various system programs, such as a framework layer, a core library layer, and a driver layer, for implementing various basic services and processing hardware-based tasks. The application program 13022 includes various application programs such as a Media Player, a Browser, and the like, for implementing various application services. Programs for implementing the methods in some embodiments of the present disclosure may be included in the application program 13022.

The method disclosed by some embodiments of the present disclosure described above may be applied to, or implemented by, the processor 1301. The processor 1301 may be an integrated circuit chip with a signal processing capability. In implementation, steps in the method described above may be accomplished by integrated logic circuitry of hardware in the processor 1301 or instructions in a form of software. The processor 1301 described above may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The disclosed methods, steps, and logic blocks in some embodiments of the present disclosure may be implemented or performed. The general purpose processor may be a microprocessor or the processor may be any conventional processor or the like. The steps in the method disclosed in connection with some embodiments of the present disclosure may be implemented directly by a hardware decoding processor, or by a combination of hardware and software modules in a decoding processor. A software module may be located in a storage medium known in the art such as a random access memory, a flash memory, a read only memory, a programmable read only memory, or an electrically erasable programmable memory, registers, etc. The storage medium is located in the storage 1302 and the processor 1301 reads information in the storage 1302 and performs steps of the method described above in conjunction with hardware of the processor.

It may be appreciated that the embodiments described in some embodiments of the present disclosure may be implemented in hardware, software, firmware, middleware, microcode, or a combination thereof. For a hardware implementation, the processing unit may be implemented in one or more Application Specific Integrated Circuits (ASICs), a Digital Signal Processing (DSP), a Digital Signal Processing Device (DSPD device or DSPD), a Programmable Logic Device (PLD), a Field Programmable Gate Array (FPGA), a general purpose processor, a controller, a microcontroller, a microprocessor, other electronic units for performing functions described in the present disclosure, or a combination thereof.

For a software implementation, techniques described in some embodiments of the present disclosure may be implemented by modules (e.g., processes, functions, etc.) that perform the functions described in some embodiments of the present disclosure. A software code may be stored in the storage and executed by a processor. The storage may be implemented inside the processor or external to the processor.

Specifically, the processor 1301 may call a program or an instruction stored in the storage 1302 to specifically perform: determining resource configuration information corresponding to a control resource set; acquiring blind detection information based on a first correspondence relation between the resource configuration information and the blind detection information, wherein the blind detection information includes at least one of: a length of downlink control information (DCI), an aggregation level of candidate control channels, and a length of a Resource Allocation (RA) field in the DCI; based on the blind detection information, control the network interface 1304 to receive DCI transmitted by the network side device on the control resource set.

Optionally, the processor 1301 is further configured to control the network interface 1304 to receive configuration information of a first correspondence relation transmitted by the network side device, wherein the configuration information of the first correspondence relation includes the first correspondence relation.

In the terminal shown in FIG. 13, various specific implementations of the first correspondence relation may be obtained by referring to the above embodiments, and will not be repeated herein.

Optionally, when the blind detection information includes a length of DCI and the DCI includes a Resource Allocation (RA) field, The processor 1301 is further configured to acquire a length of the RA based on a second correspondence relation between a length of the DCI and a length of the RA; receive, based on the length of the DCI and the length of the RA, the DCI transmitted by the network side device on the control resource set.

The processor 1301 is further configured to control the network interface 1304 to receive configuration information of a second correspondence relation transmitted by the network side device, wherein the configuration information of the second correspondence relation includes the second correspondence relation.

The processor 1301 is further configured to determine, based on a third correspondence relation between the resource configuration information and configuration information of a PDSCH, the configuration information of the PDSCH for transmitting data, wherein the configuration information of the PDSCH includes at least one of a reception bandwidth of the PDSCH, position information of the PDSCH, and a size of a RBG for transmitting the PDSCH; the position information of the PDSCH includes a start symbol position and/or an end symbol position of the PDSCH.

The processor 1301 is further configured to control, based on the configuration information of the PDSCH and the DCI, the network interface 1304 to receive data transmitted on the PDSCH.

The processor 1301 is further configured to control the network interface 1304 to receive data transmitted on the PDSCH according to the configuration information of the PDSCH and the DCI.

The processor 1301 is further configured to control the network interface 1304 to receive configuration information of a third correspondence relation transmitted by the network side device, wherein the configuration information of the third correspondence relation includes the third correspondence relation.

In the terminal shown in FIG. 13, various specific implementations of the third correspondence relation may be obtained from the above embodiments, and will not be repeated herein.

The processor 1301 is further configured to control the network interface 1304 to receive resource configuration information corresponding to each of at least one control resource set transmitted by the network side device.

The processor 1301 is further configured to monitor the at least one control resource set based on the resource configuration information corresponding to each of the at least one control resource set so as to determine a control resource set for transmitting the DCI; and determine, based on the control resource set for transmitting the DCI, resource configuration information corresponding to the control resource set.

The terminal shown in FIG. 13 acquires, based on a first correspondence relation between resource configuration information and blind detection information, at least one of a length of blind downlink control information (DCI), an aggregation level of candidate control channels, and a length of a Resource Allocation (RA) field in the DCI through determining resource configuration information corresponding to the control resource set. That is, the terminal may acquire additional resource indication based on the first correspondence relation, without needing the network side device to transmit the blind detection information, and may dynamically acquire an updated resource indication based on a change of the resource control set, so that a resource indication manner is more flexible, and the terminal may perform targeted blind detection based on the acquired at least one of the length of the DCI, the aggregation level of the candidate control channels, and the length of the Resource Allocation (RA) field in the DCI. The efficiency of blind detection is improved.

Figure 14:
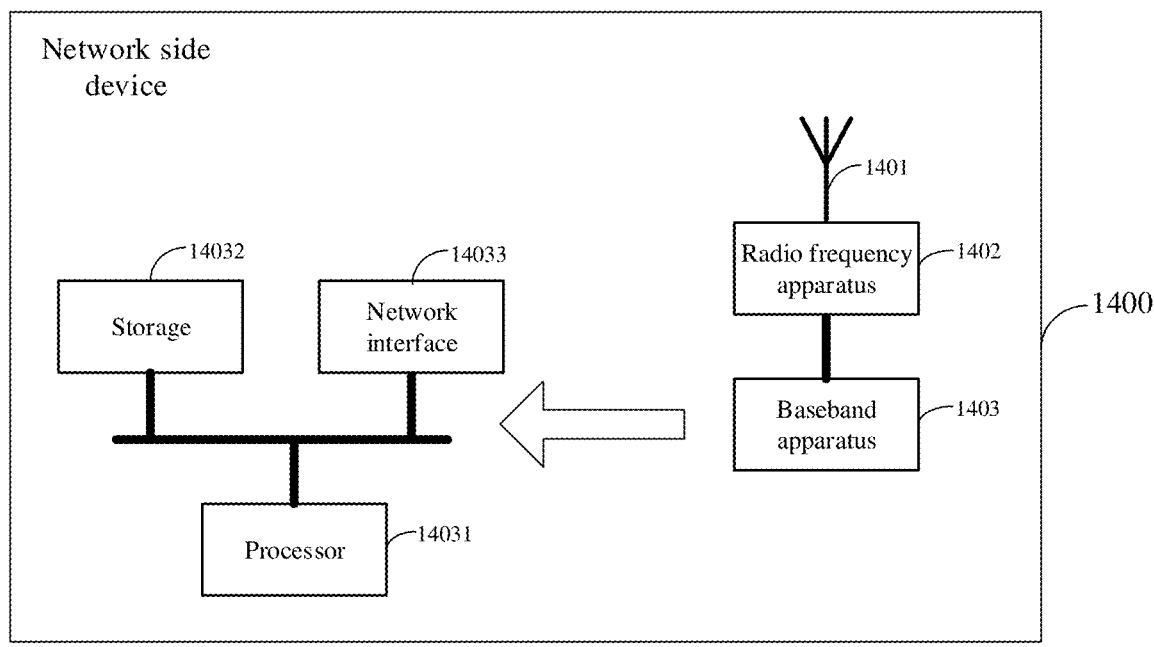
FIG. 14 is a schematic structural diagram of a network side device provided by some embodiments of the present disclosure.

FIG. 14 is a schematic structural diagram of a network side device provided by some embodiments of the present disclosure. As shown in FIG. 14, the network side device 1400 includes an antenna 1401, a radio frequency apparatus 1402, and a baseband apparatus 1403. The antenna 1401 is connected to a radio frequency apparatus 1402. In an uplink direction, the radio frequency apparatus 1402 receives information through the antenna 1401, and transmits the received information to the baseband apparatus 1403 for processing. In a downlink direction, the baseband apparatus 1403 processes information to be transmitted and transmits the processed information to the radio frequency apparatus 1402, and the radio frequency apparatus 1402 processes the received information and transmits the processed received information via the antenna 1401.

A frequency-band processing apparatus described above may be located in the baseband apparatus 1403, and the method performed by the network side apparatus in the above embodiments may be implemented in the baseband apparatus 1403. The baseband apparatus 1403 includes a processor 14031 and a storage 14032.

The baseband apparatus 1403 may, for example, include at least one baseband board provided with a plurality of chips, as shown in FIG. 12. One of the plurality of chips is, for example, a processor 14031, is connected to the storage 14032, so as to call a program in the storage 14032 to perform an operation of a network side device shown in the above method embodiment.

The baseband apparatus 1403 may further include a network interface 14033 for interacting information with the radio frequency apparatus 1402. This interface is, for example, a common public radio interface (CPRI, for short).

The processor herein may be a processor, or may be a general name of a plurality of processing elements, for example, the processor may be a CPU, or may be an ASIC, or may be one or more integrated circuits, such as one or more microprocessor DSP, or one or more Field Programmable Gate Arrays (FPGAs), configured to implement the methods performed by the above network side device. The storage element may be one storage or may represent a plurality of storage elements.

The storage 14032 may be a volatile storage or a non-volatile storage, or may include both volatile and non-volatile storages. The non-volatile storage may be a Read-Only Memory (ROM), a Programmable ROM (PROM), an Erasable PROM (EPROM), an Electrically EPROM (EEPROM), or a flash memory. The volatile storage may be a Random Access Memory (RAM), which serves as an external cache. By way of example but not limitation, many forms of RAM may be used, such as a Static RAM (SRAM), a Dynamic RAM (DRAM), a Synchronous DRAM (SDRAM), a Double Data Rate SDRAM (DDRSDRAM)), an Enhanced SDRAM (ESDRAM), a Synchronous link DRAM (SLDRAM) and a Direct Rambus RAM (DRRAM). The storage 1302 in the present disclosure is intended to include, but is not limited to, these and any other suitable types of storages.

Specifically, the processor 14031 calls a program in the storage 14032 to control the radio frequency apparatus 1402 to: transmit configuration information of a first correspondence relation to a terminal, wherein the configuration information of the first correspondence relation includes a first correspondence relation between blind detection information and resource configuration information of a resource control set for transmitting downlink control information (DCI), wherein the blind detection information includes at least one of a length of downlink control information (DCI), an aggregation level of candidate control channels and a length of Resource Allocation (RA) field in the DCI; and transmit DCI to the terminal on the control resource set.

In the network side device shown in FIG. 14, various specific implementations of the first correspondence relation may be obtained from the above embodiments, and will not be repeated herein.

Optionally, the blind detection information includes a length of DCI, wherein the DCI includes a Resource Allocation (RA) field. The processor 14031 is further configured to control the radio frequency apparatus 1402 to transmit configuration information of a second correspondence relation to the terminal, wherein the configuration information of the second correspondence relation includes the second correspondence relation between a length of the DCI and a length of the RA.

Optionally, the processor 14031 is further configured to control the radio frequency apparatus 1402 to: transmit configuration information of a third correspondence relation to the terminal, wherein the configuration information of the third correspondence relation includes a correspondence relation between the resource configuration information and configuration information of a PDSCH. The configuration information of the PDSCH includes at least one of: a reception bandwidth of the PDSCH, position information of the PDSCH, a size of a RBG for transmitting the PDSCH, and the position information of the PDSCH includes a start symbol position and/or an end symbol position of the PDSCH.

In the network side device shown in FIG. 14, various specific implementations of the third correspondence relation may be obtained from the above embodiments, and will not be repeated herein.

Optionally, the processor 14031 is further configured to control the radio frequency apparatus 1402 to: transmit resource configuration information corresponding to each of at least one control resource set to the terminal.

The network side device transmits configuration information of a first correspondence relation to a terminal, wherein the configuration information of the first correspondence relation includes a first correspondence relation between blind detection information and resource configuration information of a resource control set for transmitting downlink control information (DCI), wherein the blind detection information includes at least one of a length of downlink control information (DCI), an aggregation level of candidate control channels and a length of Resource Allocation (RA) field in the DCI; and the network side device transmits DCI to the terminal on the control resource set. That is, the network side device performs a targeted indication to a blind detection range of the terminal, the number of times of terminal blind detection is reduced, and the efficiency of blind detection is improved.

Those of ordinary skills in the art will appreciate that elements and algorithm steps in examples described in connection with embodiments disclosed in some embodiments of the present disclosure may be implemented in electronic hardware, or a combination of computer software and electronic hardware. Whether these functions are performed in a form of hardware or software depends on a specific application and a design constraint of a technical solution. Those skilled in the art may use different methods to implement the described functionality for each particular application, but such implementation should not be considered to go beyond the scope of the present disclosure.

Those skilled in the art may clearly understand that, for convenience and brevity of description, specific working processes of the systems, devices and units described above may be obtained by referring to a corresponding process in the method embodiments described above, and will not be described again herein.

In the embodiments provided by the present disclosure, it should be understood that the disclosed apparatus and methods may be implemented in other ways. For example, the apparatus embodiments described above are merely illustrative. For example, a division of units is only a logical function division, and another division of the unit may be implemented in a practical application. For example, multiple units or components may be combined or integrated into another system, or some features may be ignored, or not performed. Optionally, a coupling or a direct coupling or communication connection between elements shown or discussed may be an indirect coupling or a communication connection through some interfaces, devices or units, or may be in an electrical, mechanical or other form.

Elements described as separate elements may or may not be physically separate, elements shown as elements may or may not be physical elements, i.e. may be located in one place, or may also be distributed over a plurality of network elements. Some or all of the units may be selected according to actual needs to achieve a purpose of a technical solution of the present embodiment.

In addition, each functional unit in each embodiment of that present invention may be integrated in one processing unit, may be physically separated, or two or more of the units may be integrated in one unit.

The functions, if implemented in a form of software functional units and sold or used as separate products, may be stored in a computer readable storage medium. Based on this understanding, an essence of the technical solution of the present disclosure, or a part of the technical solution of the present disclosure contributing to the related art, or a part of the technical solution may be embodied in a form of a software product stored in a storage medium. The computer software product is stored in a storage medium, and includes a number of instructions used to cause a computer device (which may be a personal computer, a server, or a network device, etc.) to perform all or parts of the steps of the method described in various embodiments of the present disclosure. The aforementioned storage medium includes various medium capable of storing program codes, such as a USB disk, a removable hard disk, a ROM, a RAM, a magnetic disk, or a compact disc.

What is described above is optional embodiments of the present disclosure. The protection scope of the present disclosure is not limited thereto. Any person familiar with ordinary skills in the art may easily think of several modifications or replacements without departing from the principles of the present disclosure. These modifications and replacements are also within the scope of the present disclosure. Thus, the protection scope of the present disclosure should be in accord with the protection scope of the claims.

Finally, it should be noted that the above embodiments are only used to illustrate the technical solutions of the present disclosure, and are not used to limit the present disclosure. Although the present disclosure has been described in detail with reference to the foregoing embodiments, it should be understood by those of ordinary skills in the art that modifications may be made to the technical solutions described in the foregoing embodiments, or an equivalent replacement of some or all of the technical features thereof may be performed. These modifications or replacements do not cause an essence of corresponding technical solutions to depart from the scope of the technical solutions of the embodiments of the present disclosure.

What is claimed is:

1. A method of transmitting downlink control information, comprising:
   determining, by a terminal, resource configuration information corresponding to a control resource set;
   acquiring, by the terminal, blind detection information based on a first correspondence relation between the resource configuration information and the blind detection information, wherein the blind detection information comprises at least one of: a length of the downlink control information (DCI), an aggregation level of candidate control channels, and a length of a resource allocation (RA) field in the DCI; and
   receiving, by the terminal based on the blind detection information, DCI transmitted by the network side device on the control resource set;
   wherein the resource configuration information comprises an identifier of the control resource set, and the first correspondence relation comprises at least one correspondence relation of the following:
   a correspondence relation between an identifier of a control resource set and the length of DCI;
   a correspondence relation between an identifier of a control resource set and the aggregation level of candidate control channels; and
   a correspondence relation between an identifier of a control resource set and the length of RA;
   wherein after the determining, by the terminal, resource configuration information corresponding to the control resource set, the method further comprises:
   determining, by the terminal based on a third correspondence relation between the resource configuration information and configuration information of a Physical Downlink Share Channel (PDSCH), configuration information of the PDSCH for transmitting data, wherein the configuration information of the PDSCH comprises at least one of a reception bandwidth of the PDSCH, position information of the PDSCH, a size of a Resource Block Group (RBG) for transmitting the PDSCH; the position information of the PDSCH comprises a start symbol position and/or an end symbol position of the PDSCH;

after the receiving, by the terminal based on the blind detection information, DCI transmitted by the network side device on the control resource set, the method further comprises:

receiving, by the terminal based on the configuration information of the PDSCH and the DCI, data transmitted on the PDSCH;

wherein before the determining, by the terminal based on the third correspondence relation between the resource configuration information and the configuration information of the PDSCH, the configuration information of the PDSCH for transmitting data, the method further comprises:

receiving, by the terminal, third correspondence relation configuration information transmitted by the network side device, wherein the third correspondence relation configuration information comprises the third correspondence relation.

2. The method according to claim 1, wherein before acquiring, by the terminal, the blind detection information based on the first correspondence relation between the resource configuration information and the blind detection information, the method further comprises:

receiving, by the terminal, first correspondence relation configuration information transmitted by the network side device, wherein the first correspondence relation configuration information comprises the first correspondence relation.

3. The method according to claim 1, wherein the identifier of the control resource set is used to indicate a time-domain position and/or a frequency-domain position of the control resource set.

4. The method according to claim 3, wherein the identifier of each control resource set corresponds to a different length of DCI, and an identifier of each control resource set correspond to a respective length of at least one DCI;

identifiers of different control resource sets correspond to aggregation levels of different candidate control channels, and an identifier of each control resource set corresponds to an aggregation level of at least one candidate control channel; and identifiers of different control resource sets correspond to lengths of different RAs, and an identifier of each control resource set corresponds to a respective length of at least one RA.

5. The method according to claim 1, wherein the resource configuration information comprises an interleaving mode of a Resource Element Group (REG) in the control resource set, and the first correspondence relation comprises at least one correspondence relation of the following:

a correspondence relation between the interleaving mode of the REG and the length of DCI;

a correspondence relation between the interleaving mode of the REG and the aggregation level of candidate control channels; and a correspondence relation between the interleaving mode of the REG and the length of RA.

6. The method according to claim 5, wherein each interleaving mode corresponds to a different length of DCI, and each interleaving mode corresponds to a respective length of at least one DCI;

different interleaving modes correspond to aggregation levels of candidate control channels of different control channels, and each interleaving mode corresponds to an aggregation level of at least one candidate control channel; and different interleaving modes correspond to lengths of different RAs, and each interleaving mode corresponds to a respective length of at least one RA.

7. The method according to claim 1, wherein the resource configuration information comprises a mapping mode of a Resource Element Group (REG) in the control resource set, and the first correspondence relation comprises at least one correspondence relation of the following:

a correspondence relation between a mapping mode of the REG and the length of DCI;

a correspondence relation between a mapping mode of the REG and the aggregation level of candidate control channels; and a correspondence relation between a mapping mode of the REG and the length of RA.

8. The method according to claim 1, wherein the blind detection information comprises the length of DCI, wherein the DCI comprises the Resource Allocation (RA) field;

after acquiring, by the terminal, the blind detection information based on the first correspondence relation between the resource configuration information and the blind detection information, the method further comprises:

acquiring, by the terminal, the length of the RA based on a second correspondence relation between the length of the DCI and the length of the RA;

receiving, by the terminal based on the blind detection information, DCI transmitted by the network side device on the control resource set comprises:

receiving, by the terminal based on the length of the DCI and the length of the RA, the DCI transmitted by the network side device on the control resource set.

9. The method according to claim 1, wherein the resource configuration information comprises an identifier of the control resource set, and the third correspondence relation comprises at least one correspondence relation of the following:

a correspondence relation between the identifier of the control resource set and a reception bandwidth of the PDSCH;

a correspondence relation between the identifier of the control resource set and position information of the PDSCH; and a correspondence relation between the identifier of the control resource set and a size of a RBG for transmitting the PDSCH, wherein the identifier of the control resource set is used to indicate a time-domain position and/or a frequency-domain position of the control resource set; or, the resource configuration information comprises an interleaving mode of a Resource Element Group (REG) in the control resource set, and the third correspondence relation comprises at least one correspondence relation of the following:

a correspondence relation between an interleaving mode of the REG and a reception bandwidth of the PDSCH;

a correspondence relation between an interleaving mode of the REG and position information of the PDSCH; and
a correspondence relation between an interleaving mode of the REG and a size of a RBG for transmitting the PDSCH; or,
the resource configuration information comprises a mapping mode of a Resource Element Group (REG) in the control resource set, the third correspondence relation comprises at least one correspondence relation of the following:
a correspondence relation between a mapping mode of the REG and a reception bandwidth of a PDSCH;
a correspondence relation between a mapping mode of the REG and position information of a PDSCH; and
a correspondence relation between a mapping mode of the REG and a size of the RBG for transmitting a PDSCH.

10. The method according to claim 1, wherein before determining, by the terminal, resource configuration information corresponding to the control resource set, the method further comprises:
receiving, by the terminal, resource configuration information corresponding to each of at least one control resource set transmitted by the network side device;
determining, by the terminal, resource configuration information corresponding to the control resource set comprises:
monitoring, by the terminal, the at least one control resource set based on the resource configuration information corresponding to each of the at least one control resource set so as to determine a control resource set for transmitting the DCI; and
determining, by the terminal based on the control resource set for transmitting the DCI, resource configuration information corresponding to the control resource set.

11. A method of transmitting downlink control information, comprising:
transmitting, by a network side device, first correspondence relation configuration information to a terminal, wherein the first correspondence relation configuration information comprises a first correspondence relation between blind detection information and resource configuration information of a resource control set for transmitting downlink control information (DCI), the blind detection information comprises at least one of a length of DCI, an aggregation level of candidate control channels and a length of Resource Allocation (RA) field in the DCI; and
transmitting, by the network side device, the DCI to the terminal on the control resource set;
wherein the resource configuration information comprises an identifier of the control resource set, and the first correspondence relation comprises at least one correspondence relation of the following:
a correspondence relation between an identifier of a control resource set and the length of DCI;
a correspondence relation between an identifier of a control resource set and the aggregation level of candidate control channels; and
a correspondence relation between an identifier of a control resource set and the length of RA;
wherein the method further comprises:
transmitting, by the network side device to the terminal, third correspondence relation configuration information, wherein the third correspondence relation configuration information comprises a correspondence relation between the resource configuration information and configuration information of a Physical Downlink Share Channel (PDSCH), the configuration information of the PDSCH comprises at least one of a reception bandwidth of the PDSCH, position information of the PDSCH, a size of a Resource Block Group (RBG) for transmitting the PDSCH, and the position information of the PDSCH comprises a start symbol position and/or an end symbol position of the PDSCH.

12. The method according to claim 11, wherein the identifier of the control resource set is used to indicate a time-domain position and/or a frequency-domain position of the control resource set; or,
the resource configuration information comprises an interleaving mode of a Resource Element Group (REG) in the control resource set, and the first correspondence relation comprises at least one correspondence relation of the following:
a correspondence relation between the interleaving mode of the REG and the length of DCI;
a correspondence relation between the interleaving mode of the REG and the aggregation level of candidate control channels; and
a correspondence relation between the interleaving mode of the REG and the length of RA; or,
the resource configuration information comprises a mapping mode of a Resource Element Group (REG) in the control resource set, the first correspondence relation comprises at least one correspondence relation of the following:
a correspondence relation between a mapping mode of the REG and the length of DCI;
a correspondence relation between a mapping mode of the REG and the aggregation level of candidate control channels; and
a correspondence relation between a mapping mode of the REG and the length of RA.

13. The method according to claim 11, wherein the blind detection information comprises the length of DCI, wherein the DCI comprises the Resource Allocation (RA) field;
the method further comprises:
transmitting, by the network side device, second correspondence relation configuration information to the terminal, wherein the second correspondence relation configuration information comprises a second correspondence relation between the length of DCI and the length of RA.

14. The method according to claim 11, wherein the resource configuration information comprises an identifier of the control resource set, and the third correspondence relation comprises at least one correspondence relation of the following:
a correspondence relation between the identifier of the control resource set and a reception bandwidth of the PDSCH;
a correspondence relation between the identifier of the control resource set and position information of the PDSCH; and
a correspondence relation between the identifier of the control resource set and a size of a RBG for transmitting the PDSCH,
wherein the identifier of the control resource set is used to indicate a time-domain position and/or a frequency-domain position of the control resource set; or,
the resource configuration information comprises an interleaving mode of a Resource Element Group (REG) in the control resource set, the third correspondence relation comprises at least one correspondence relation of the following:

a correspondence relation between an interleaving mode of the REG and a reception bandwidth of the PDSCH;

a correspondence relation between an interleaving mode of the REG and position information of the PDSCH; and a correspondence relation between an interleaving mode of the REG and a size of a RBG for transmitting the PDSCH; or, the resource configuration information comprises a mapping mode of a Resource Element Group (REG) in the control resource set, the third correspondence relation comprises at least one correspondence relation of the following:

a correspondence relation between a mapping mode of the REG and a reception bandwidth of a PDSCH;

a correspondence relation between a mapping mode of the REG and position information of a PDSCH; and a correspondence relation between a mapping mode of the REG and a size of the RBG for transmitting a PDSCH.

15. The method according to claim 11, further comprising:

transmitting, by the network side device, resource configuration information corresponding to each of at least one control resource set to the terminal.

16. A terminal, comprising:

at least one processor, a storage, at least one network interface, and a bus system, wherein the at least one processor, the storage, and the at least one network interface are coupled together through the bus system, the storage is configured to store an executable program and data, the at least one processor is configured to invoke the program and data stored in the storage to perform the method according to claim 1.

17. A network side device, comprising:

at least one processor, a storage, at least one network interface, and a bus system, wherein the at least one processor, the storage, and the at least one network interface are coupled together through the bus system, the storage is configured to store an executable program and data, the at least one processor is configured to invoke the program and data stored in the storage to perform the method according to claim 11.

* * * * *